United States Patent
Sato

(10) Patent No.: US 7,948,662 B2
(45) Date of Patent: May 24, 2011

(54) IMAGE PROCESSING APPARATUS AND METHOD FOR PERFORMING SHADE CORRECTION ON GENERATED IMAGE USING A SHADING COEFFICIENT

(75) Inventor: Hideo Sato, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1244 days.

(21) Appl. No.: 11/553,564

(22) Filed: Oct. 27, 2006

(65) Prior Publication Data

US 2007/0097438 A1   May 3, 2007

(30) Foreign Application Priority Data

Oct. 31, 2005   (JP) .................................. 2005-317114

(51) Int. Cl.
H04N 1/40 (2006.01)
H04N 1/38 (2006.01)
H04N 1/387 (2006.01)

(52) U.S. Cl. ........ 358/464; 358/462; 358/463; 358/448; 358/453

(58) Field of Classification Search .................... 358/3.1, 358/474, 2.1, 446, 448, 462, 463, 464, 453, 358/505, 516, 525, 1.9; 382/169, 237, 199, 382/274, 275, 128, 283, 171, 173, 176, 270, 382/273

See application file for complete search history.

(56) References Cited

U.S. PATENT DOCUMENTS

| | | | | |
|---|---|---|---|---|
| 4,991,030 A | | 2/1991 | Sato et al. | 358/474 |
| 5,280,367 A | * | 1/1994 | Zuniga | 358/462 |
| 5,670,205 A | | 9/1997 | Miyazaki et al. | 427/64 |
| 5,714,195 A | | 2/1998 | Shiba et al. | 427/140 |
| 5,751,848 A | * | 5/1998 | Farrell | 382/172 |
| 5,768,412 A | * | 6/1998 | Mitsuyama et al. | 382/173 |
| 5,844,233 A | | 12/1998 | Sato | 250/208.1 |
| 5,982,511 A | | 11/1999 | Sato | 358/475 |
| 6,028,958 A | * | 2/2000 | Kanamori | 382/171 |
| 6,141,118 A | | 10/2000 | Yamawaki et al. | 358/481 |
| 6,359,706 B1 | | 3/2002 | Arita et al. | 358/486 |
| 6,567,544 B1 | * | 5/2003 | Kanno et al. | 382/169 |
| 6,631,209 B1 | * | 10/2003 | Kanamori | 382/169 |
| 6,697,497 B1 | * | 2/2004 | Jensen et al. | 382/100 |
| 6,738,164 B1 | | 5/2004 | Shimomura et al. | 358/474 |
| 7,058,222 B2 | * | 6/2006 | Li et al. | 382/170 |
| 2006/0209363 A1 | | 9/2006 | Suenaga et al. | 358/474 |

FOREIGN PATENT DOCUMENTS

| | | |
|---|---|---|
| JP | 8-279911 | 10/1996 |
| JP | 2001-236463 | * 8/2001 |
| JP | 2002-118735 | 4/2002 |
| JP | 3549478 | 4/2004 |
| JP | 2005-192153 | 7/2005 |
| JP | 2006-261993 | 9/2006 |

* cited by examiner

Primary Examiner — Benny Q Tieu
Assistant Examiner — Ngon Nguyen
(74) Attorney, Agent, or Firm — Fitzpatrick, Cella, Harper & Scinto

(57) ABSTRACT

Generation of an electronic document which leaves density difference information between the background of a document and a correcting liquid applied surface is in demand. Hence, upon reading a document image and converting it into an electronic document, the background density of the document is read from the read image, and a lower density region having a density lower than the background density is extracted from the read image using the background density.

12 Claims, 27 Drawing Sheets

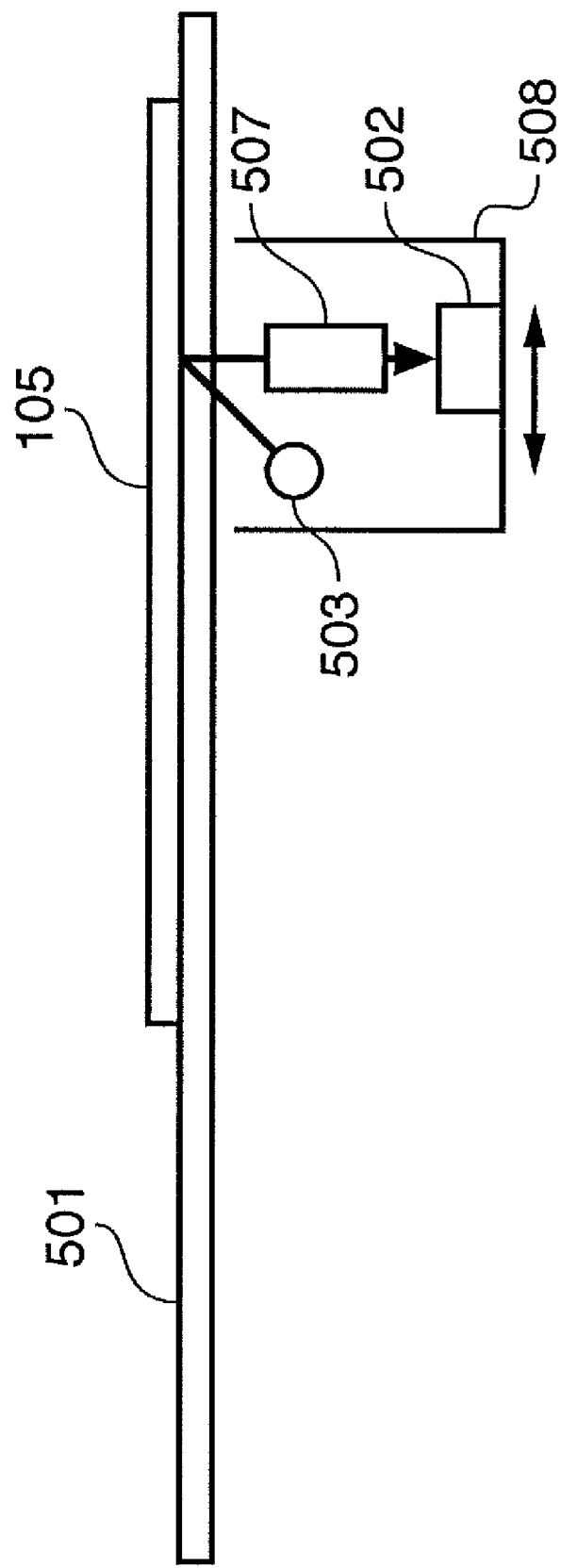

FIG. 15

CORRECTION TRACE
WAS DETECTED DURING
IMAGE READING

F I G. 17
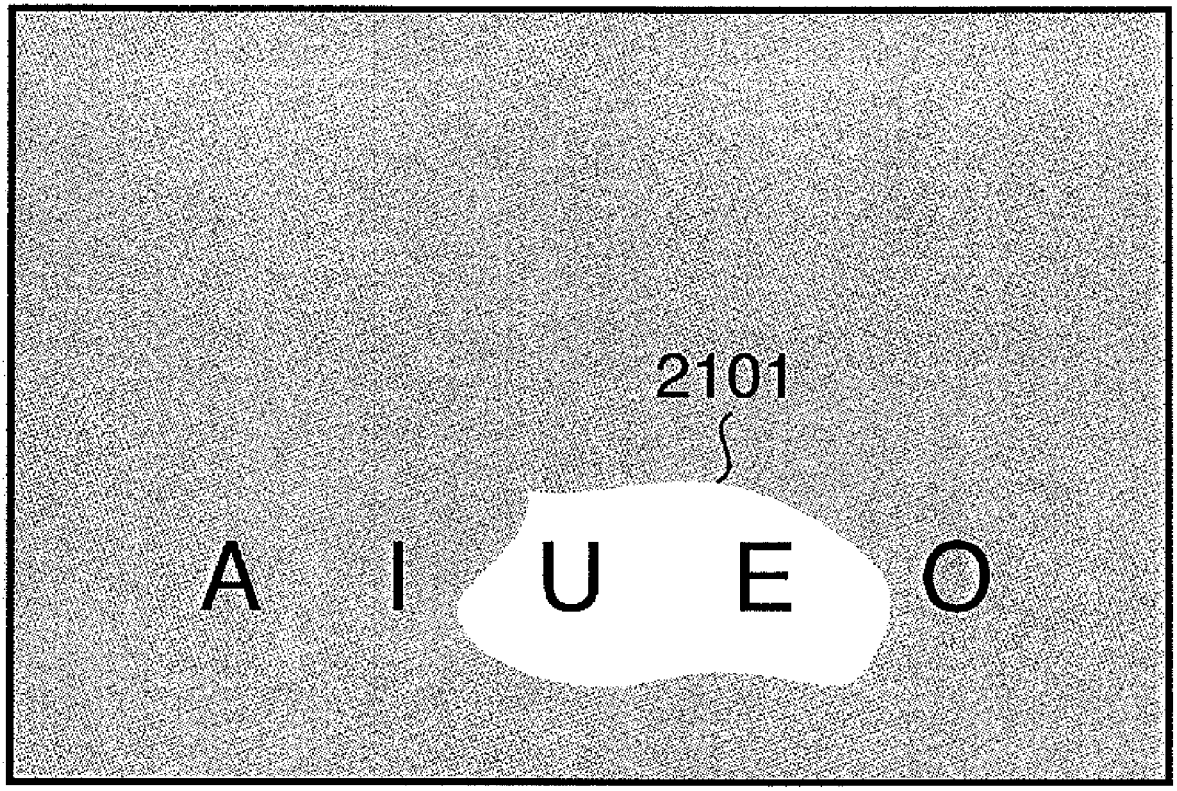

F I G. 22
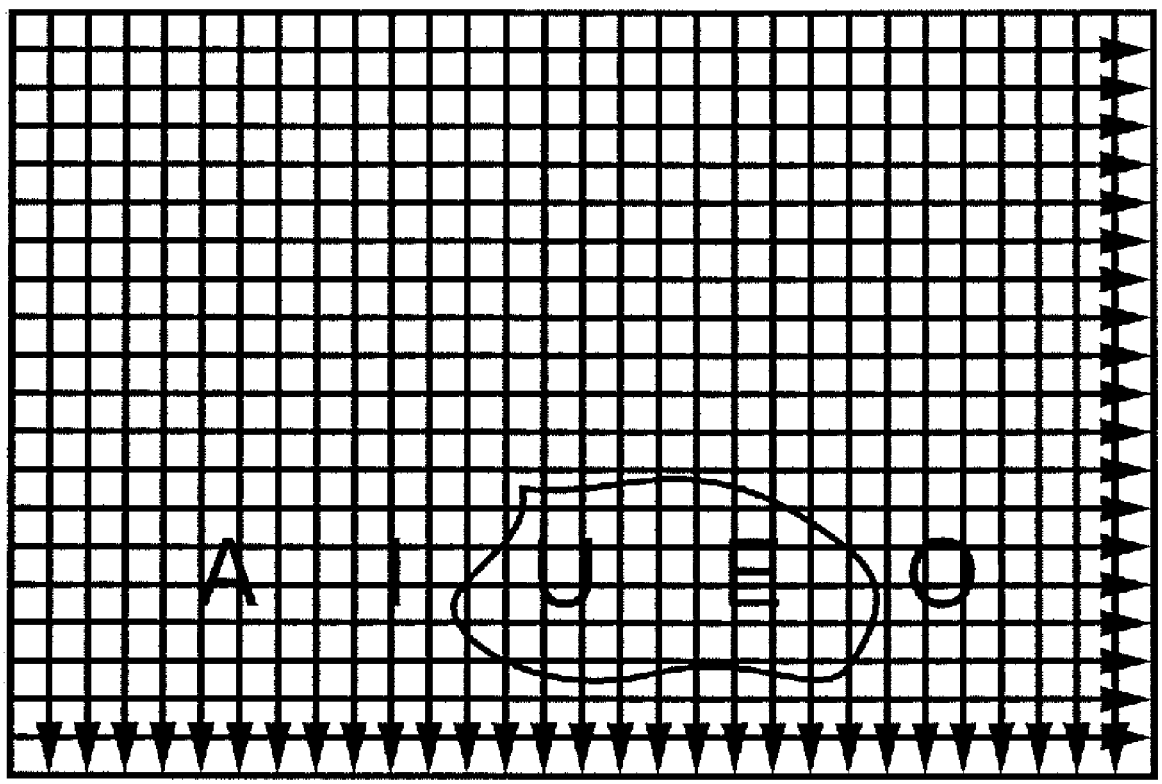

IMAGE PROCESSING APPARATUS AND METHOD FOR PERFORMING SHADE CORRECTION ON GENERATED IMAGE USING A SHADING COEFFICIENT

BACKGROUND OF THE INVENTION

1. Field of the Invention

The present invention relates to image processing for scanning a document image to generate an electronic document.

2. Description of the Related Art

A document scanner is generally used as means for optically scanning a paper document and generating an electronic document. A single-function scanner apparatus, a scanner unit equipped on a copying machine, and the like can be used as document scanners. In the following description, these apparatuses will be generically referred to as a reader.

Upon converting an image of a paper document which has an achromatic (nearly white) background with a low density into an electronic document, background color removal processing for applying signal processing to a background with a given lightness or higher to obtain a white background is executed. As a result of this processing, the contrast between the background, text, and the like becomes clear, thus obtaining a highly attractive electronic document. Upon executing data compression of the electronic document, signals of the background which occupies most area of a paper document can be adjusted to white, thus improving the compression efficiency.

In recent years, the importance of originality upon converting a paper document into an electronic document is receiving a lot of attention, and it is necessary to generate an electronic document while leaving all pieces of density difference information in a paper document. This is because when a paper document having a nearly white background has undergone modification, correction, and alteration by applying a correcting liquid, that region (to be referred to as a "modification region" hereinafter) is recognized.

The present inventors measured the difference between the reflection densities of the background and the correcting liquid applied surface upon applying the correcting liquid to the paper document having nearly white background. In case of plain paper used in a copying machine or the like, the reflection density of the background was about 0.08, and that of the surface applied with a commercially available correcting liquid was about 0.04. That is, the background color removal processing converts a read density value equal to or lower than the reflection density of 0.08 as absolute density into white. In other words, in order to generate an electronic document while leaving all pieces of density difference information in a paper document, for example, the reflection density of 0.04 may be set as absolute white.

When the reflection density of absolute white is set in consideration of the surface applied with the correcting liquid, the background and modification region yield different signal values. However, that level difference is as small as about 10 levels in case of an 8-bit signal, and it is not easy to find the modification region on the monitor of a personal computer (PC).

Japanese Patent No. 3549478 proposes a method of supporting detection of a modification region from an original paper document. With this proposal, an original paper document before modification is converted into an electronic document using a reader, and is held as a reference electronic document. When a paper document after modification is converted into an electronic document using the reader, that electronic document is compared with the held reference electronic document to change the colors of regions that produce differences from the reference electronic document, thus making the modification region easy to find.

However, the method of Japanese Patent No. 3549478 requires at least two read operations before and after modification upon generating an electronic document. Also, a storage device used to hold the reference electronic document is required, and the cost of the storage device increases in accordance with the volume of documents to handle. Furthermore, when an original paper document used to generate a reference electronic document has already been modified using a correcting liquid, its modification region cannot be detected.

SUMMARY OF THE INVENTION

The first aspect of the present invention discloses an image processing apparatus for reading a document image and converting the read document image into an electronic document, comprising: a reader, arranged to read a document image; a detector, arranged to detect a background density of a document from the image read by the reader; and a first extractor, arranged to extract a lower density region having a density lower than the background density from the image using the background density.

According to the present invention, a region having a density lower than a background can be extracted from a document image.

The second aspect of the present invention discloses an image processing apparatus for reading a document image and converting the read document image into an electronic document, comprising: a reader, arranged to read a document image; a detector, arranged to detect a background density of a document from the image read by the reader; a first extractor, arranged to extract a lower density region having a density lower than the background density from the image using the background density; and a notification section, arranged to notify, when the lower density region is found, a message that advises accordingly.

According to the present invention, when a document image includes a region having a density lower than a background, a message that advises accordingly can be generated.

The third aspect of the present invention discloses an image processing apparatus for reading a document image and converting the read document image into an electronic document, comprising: a reader, arranged to read a document image; a detector, arranged to detect a background density of a document from the image read by the reader; a first extractor, arranged to extract a lower density region having a density lower than the background density from the image using the background density; and a setting section, arranged to set boundary pixels around the lower density region.

According to the present invention, an electronic document in which a region having a density lower than a background can be easily identified can be generated.

Further features of the present invention will become apparent from the following description of exemplary embodiments with reference to the attached drawings.

BRIEF DESCRIPTION OF THE DRAWINGS

FIG. 3B is a view showing the structure of an optical system of a scanner having an equal-magnification optical system;

FIG. 15 shows a display example of a message indicating that a modification trace was found;

FIGS. 16 and 17 show a generation example of an electronic document including a modification trace;

FIG. 22 is a view for explaining two-way detections in main scan and sub-scan directions;

DESCRIPTION OF THE EMBODIMENTS

Image processing according to preferred embodiments of the present invention will be described in detail hereinafter with reference to the accompanying drawings. Note that the following description will be given taking a multi-functional peripheral equipment (MFP) as an example. However, the present invention is applicable to a copying machine, a combination of a scanner and PC, and a standalone document scanner.

First Embodiment

Arrangement of Apparatus

Figure 1:
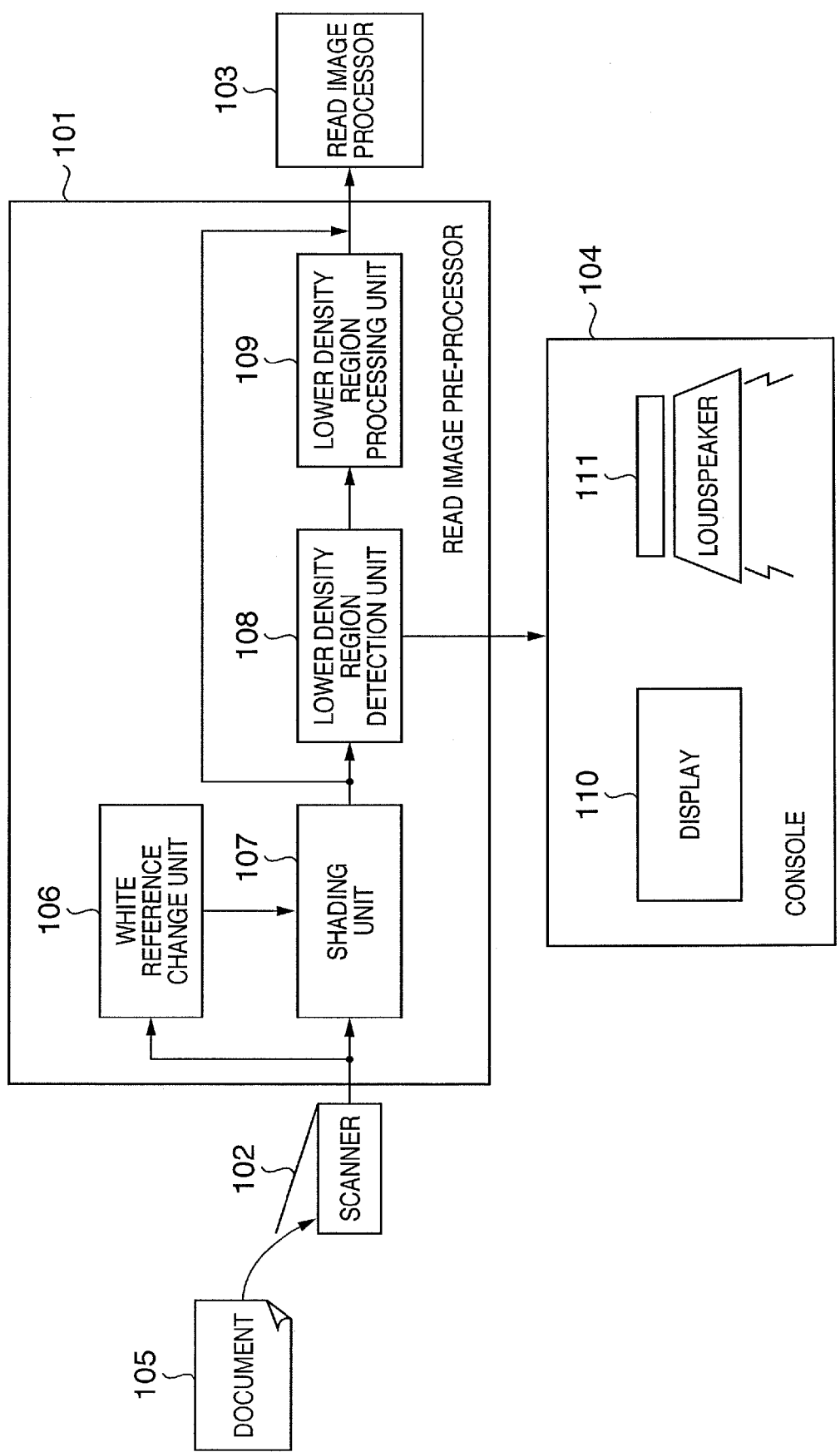
FIG. 1 is a schematic block diagram showing the arrangement of a read image pre-processor according to the first embodiment of the present invention.

FIG. 1 is a schematic block diagram showing the arrangement of a read image pre-processor 101 according to the first embodiment.

A document 105 is a paper document which includes paper documents whose forms are determined by the government, and which need be saved for a predetermined number of years by corporations and the like. A scanner 102 reads an image of the document 105 and inputs image data to the read image pre-processor 101.

A shading unit 107 of the read image pre-processor 101 applies shading correction to the input image data in accordance with shading coefficients designated by a white reference change unit 106. A lower density region detection unit 108 detects a region having a density lower than the density of a background (to be referred to as a "lower density region" hereinafter) from the shading-corrected image data by a method to be described later. The lower density region detection unit 108 displays a message indicating the presence of the lower density region on a display unit 110 of a console 104 or produces an alarm using a loudspeaker of the console 104 when it detects the lower density region so as to inform the lower density region is found. A lower density region processing unit 109 applies image processing to be described later to the detected lower density region.

After the aforementioned processing, image data is input to a read image processor 103, and undergoes image processing including filter processing, region segmentation processing, color space conversion processing, and the like.

Figure 2:
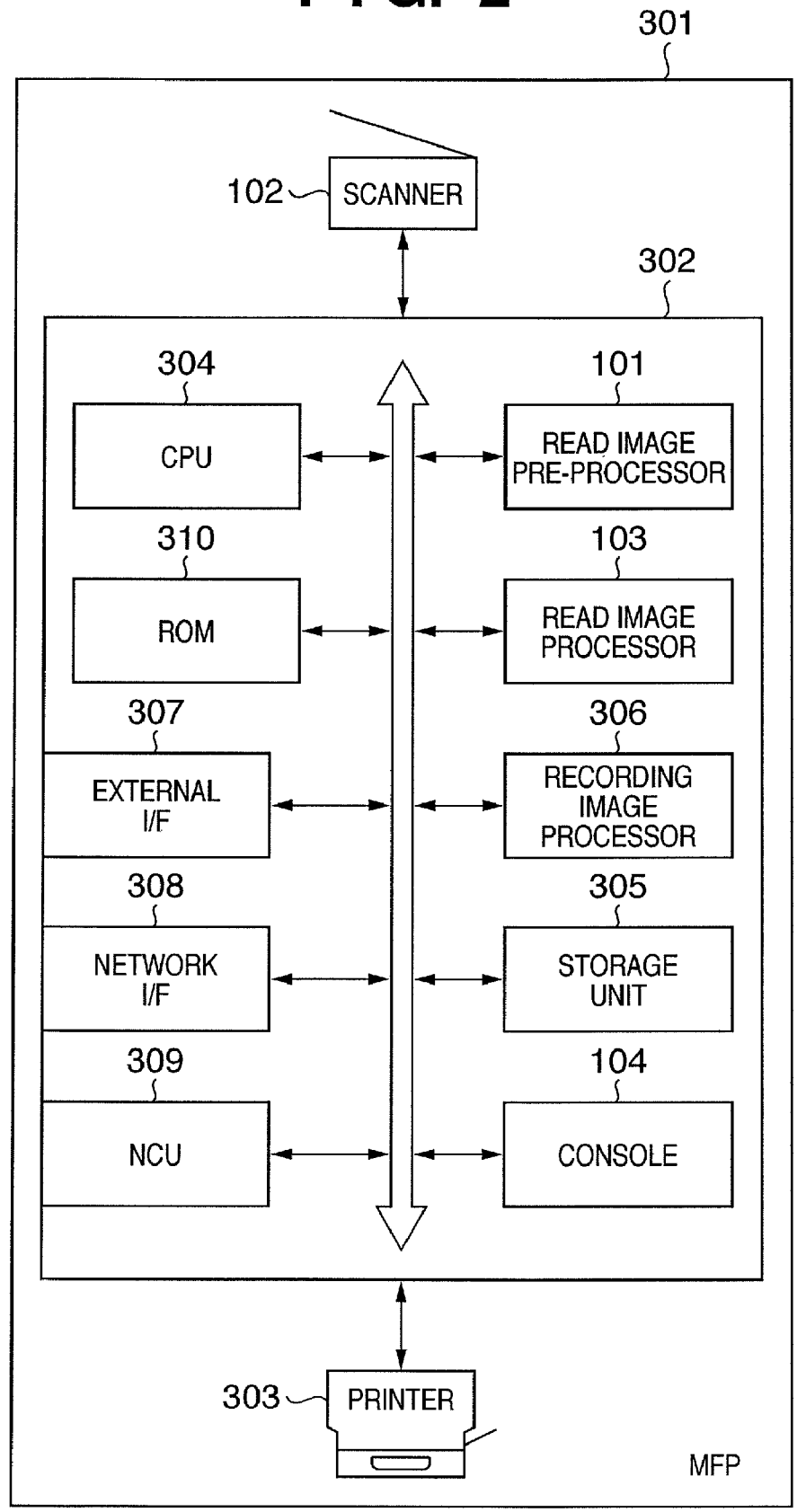
FIG. 2 is a block diagram showing the arrangement of a multi-functional peripheral equipment (MFP) including the read image pre-processor.

FIG. 2 is a block diagram showing the arrangement of an MFP 301 including the read image pre-processor 101.

The MFP 301 roughly comprises the scanner 102, a controller 302, and a printer 303. A CPU 304 of the controller 302 systematically controls the MFP 301 using a RAM of a storage unit 305 as a work memory in accordance with programs stored in a ROM 310.

The CPU 304 controls the scanner 102 to read an image. Also, the CPU 304 receives an image from an external device via an external interface (I/F) 307 or network I/F 308. Furthermore, the CPU 304 receives a facsimile image via a network control unit (NCU) 309. The CPU 304 stores the read or received image in the storage unit 305. The CPU 304 also stores images during and after the image processing in the storage unit 305. Note that the storage unit 305 includes a storage medium that allows read/write accesses such as a RAM, hard disk, and the like.

The CPU 304 also stores, in the storage unit 305, various kinds of information which are input to and set in the MFP 301 by the user by operating the console 104.

A recording image processor 306 applies image processing such as gamut mapping, gamma correction, pseudo halftone processing, and the like which are required to output image data to the printer 303.

The external I/F 307 is an interface with an external device, which comprises a serial bus such as USB (Universal Serial Bus), IEEE1394, and the like. For example, the MFP 301 connects a PC (not shown) to the external I/F 307, receives control signals and image data from the PC, applies image processing to the received image data using the recording image processor 306, and can print the processed image data using the printer 303 (printer function). Also, the MFP 301 can read an image by the scanner 102 in accordance with the control signal received from the PC, and can send image data that has undergone processing by the read image pre-processor 101 and read image processor 103 to the PC (scanner function).

The network I/F 308 is an interface with a network or the like, which is standardized by IEEE802.3. The MFP 301 communicates with external devices on the network via the network I/F 308. For example, the MFP 301 receives control signals and image data from a PC on the network, applies image processing to the received image data using the recording image processor 306, and can print the processed image data using the printer 303 (network printer function). Also, the MFP 301 reads an image by the scanner 102 in accordance with the control signal received from the PC, and can send image data that has undergone processing by the read image pre-processor 101 and read image processor 103 to the PC (network scanner function).

The NCU 309 is an interface with a public network. The MFP 301 can facsimile (FAX)-transmit and receive an image with an apparatus such as a FAX apparatus or the like via the NCU 309 and public network (FAX function).

Figure 11:
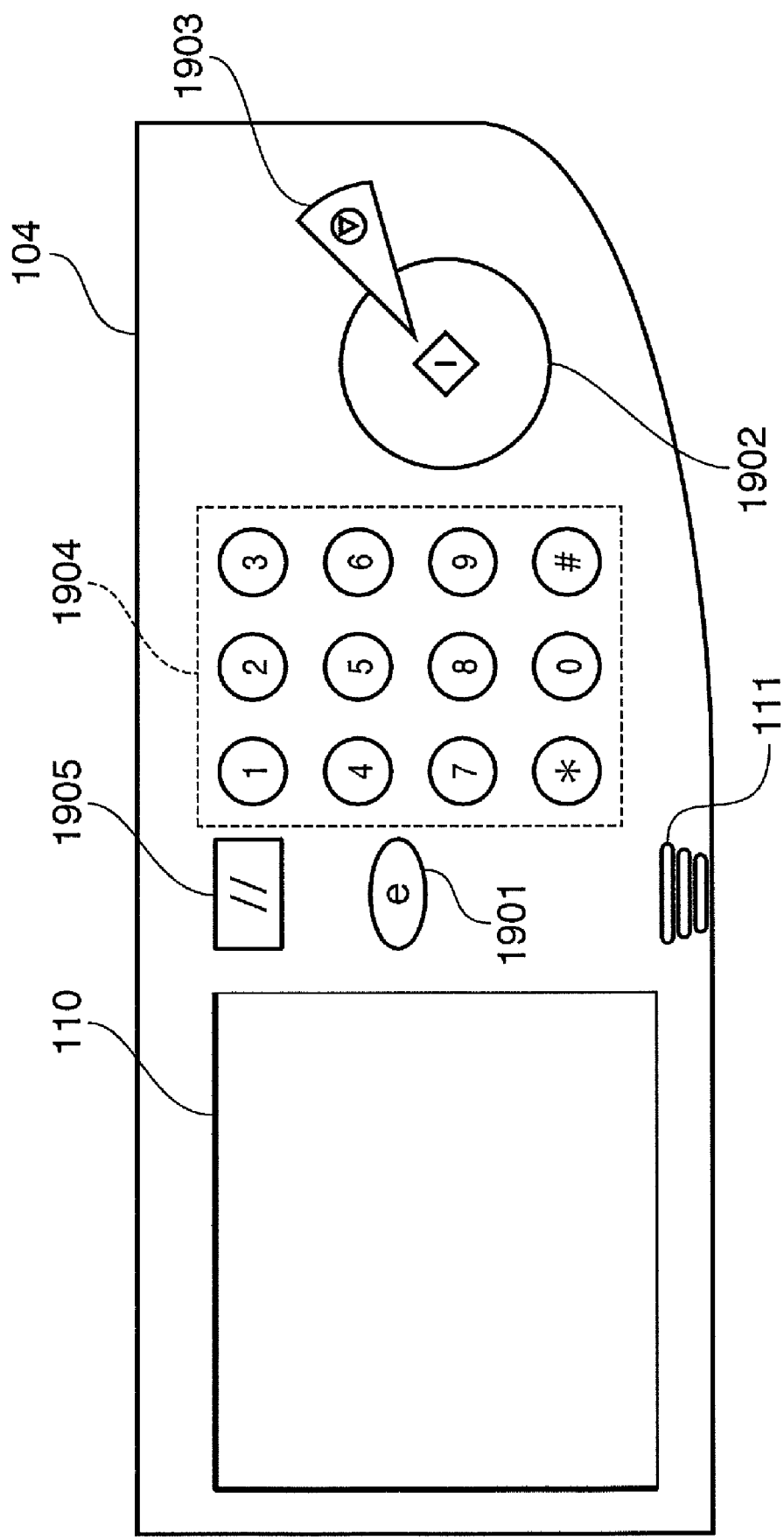
FIG. 11 shows the arrangement of a console of the MFP.

FIG. 11 shows the arrangement of the console 104 of the MFP 301. The console 104 comprises the display unit 110 (e.g., an LCD) and loudspeaker 111 described above. A read method designation key 1901 is used to designate the read operation of a document image by switching shading coefficients to be described later. A start key 1902 is used to issue a start instruction of the read operation and the like. A stop key 1903 is used to issue a stop instruction of the operation. A numeric keypad 1904 is used to designate various numerical values and the like. A reset key 1905 is used to reset the settings of the MFP 301 to a default state.

Scanner

Figure 3A:
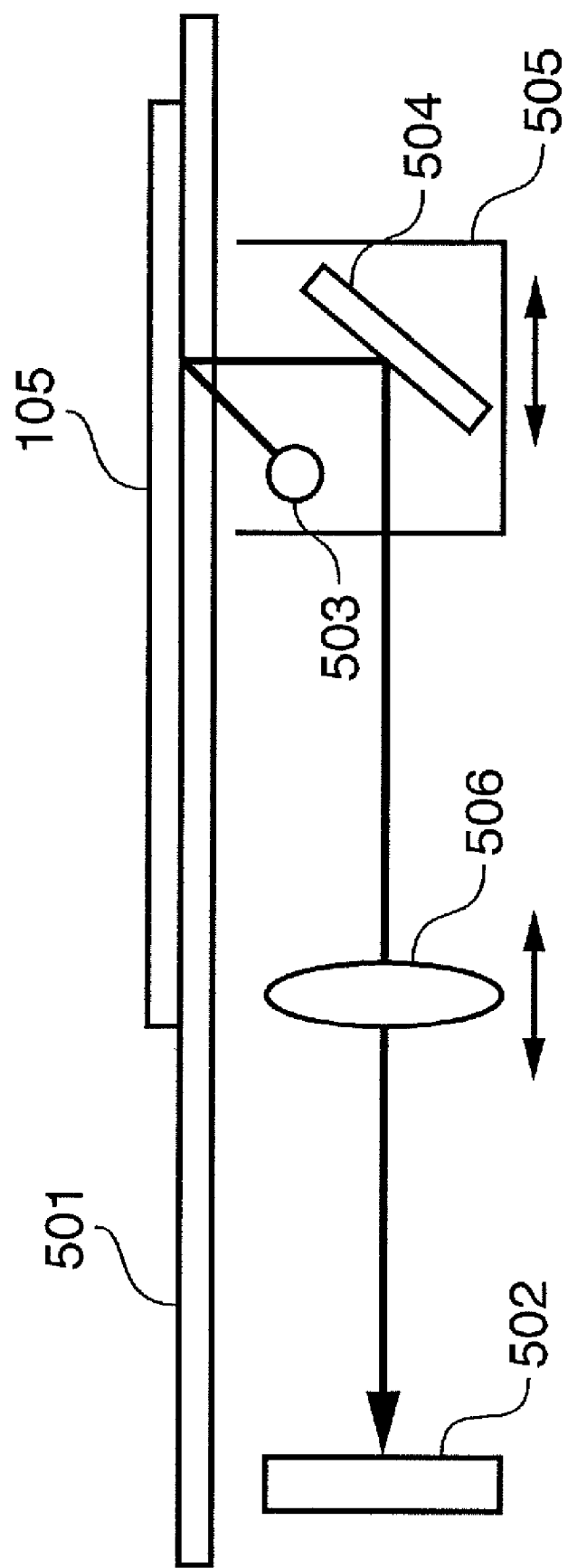
FIG. 3A is a view showing the structure of an optical system of a scanner having a reduction optical system.

FIG. 3A shows the structure of an optical system of the scanner 102 having a reduction optical system.

The document 105 set on a document table 501 is irradiated with light coming from a light source 503, and light reflected by the document 105 is reflected by a mirror 504 and enters a photoelectric conversion element 502 via a reduction lens 506. Note that the light source 503 and reflection mirror 504 have a width equal to or larger than the total width of a readable document size.

The photoelectric conversion element 502 comprises, e.g., a CCD (Charge Coupled Device), and converts incoming light into an electrical signal. The width of the photoelectric conversion element 502 is smaller than the readable document size, and the reduction ratio of the reduction lens 506 is determined based on the ratio between the readable document size and the width of the photoelectric conversion element 502.

When an optical unit 505 including the light source 503 and mirror 504, and the reduction lens 506, move in the directions of arrows in synchronism with the scan of the document 105, the entire image on the document 105 can be read.

FIG. 3B shows the structure of an optical system of the scanner 102 having an equal-magnification optical system.

The document 105 set on the document table 501 is irradiated with light coming from the light source 503, and light reflected by the document 105 enters the photoelectric conversion element 502 via an equal-magnification lens 507. Note that the light source 503, equal-magnification lens 507, and photoelectric conversion element 502 have a width equal to or larger than the total width of a readable document size.

When a CIS (Contact Image Sensor) 508 which includes the light source 503, equal-magnification lens 507, and photoelectric conversion element 502 moves in the directions of an arrow in synchronism with the scan of the document 1050 the entire image of the document 105 can be read.

In general, in order to generate color image data by reading a color image on the document 105, a light source 503 which includes the wavelengths of a visible region is used. Also, a photoelectric conversion element 502 (three-line sensor) which has color-separation filters of R (red), G (green), and B (blue) called three primary colors, and three photoelectric conversion element arrays respectively corresponding to the color separation filters is used.

Also, a photoelectric conversion element 502 having a single photoelectric conversion element array can be used. In this case, light sources R, G, and B are frame-sequentially turned on to read reflected light by the photoelectric conversion element 502, and signals corresponding to light sources R, G, and B are composited to obtain color image data.

Note that read signals of R, G, and B colors have substantially the same characteristics as long as grayscales from white to black are read. Hence, the following description will refer to the processing of one color component signal. However, other color component signals have substantially the same characteristics, and the same processing can apply.

Shading Correction

Figure 4:
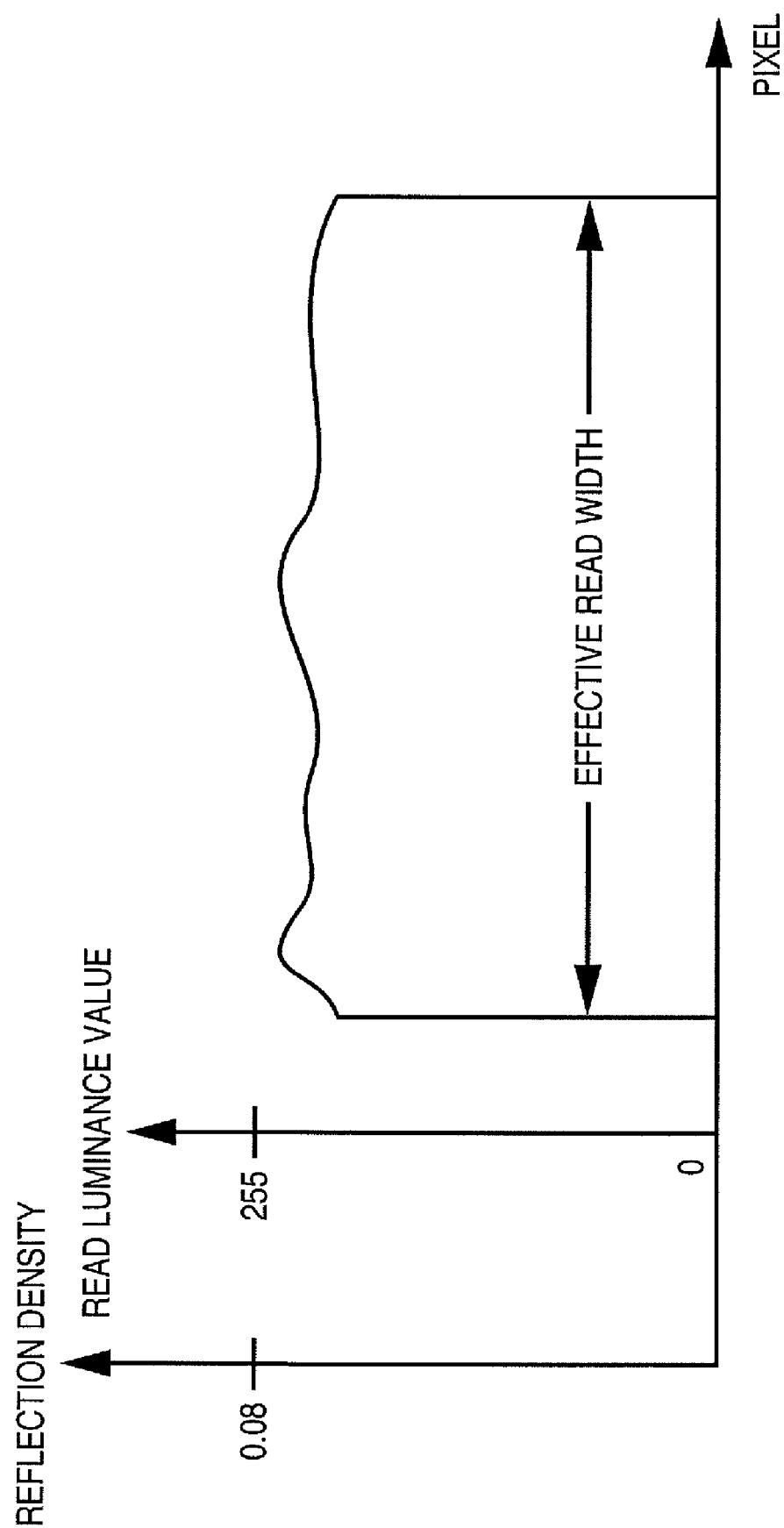
FIGS. 4 and 5 are views for explaining the processing of a shading unit.
Figure 5:
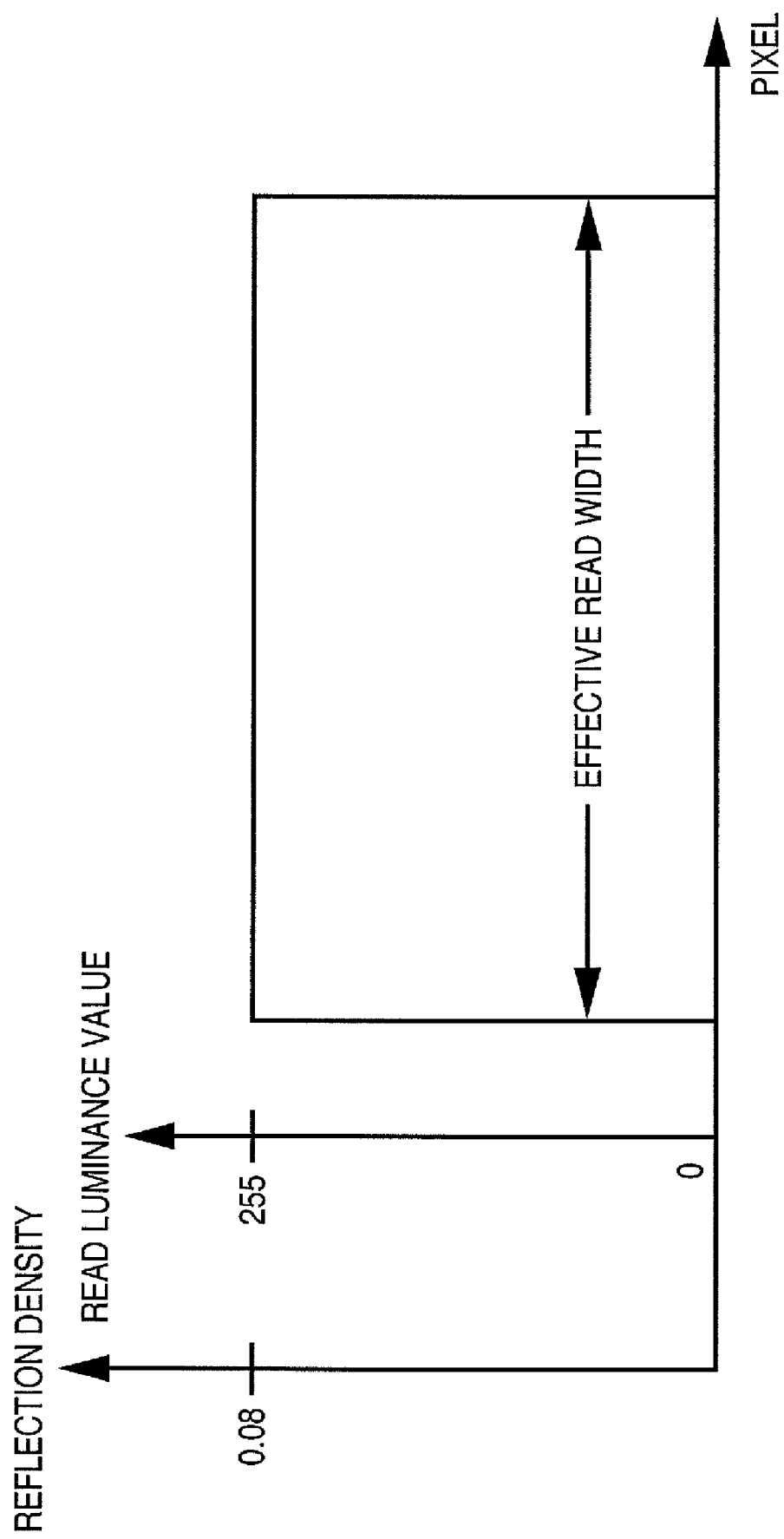

FIGS. 4 and 5 are views for explaining the processing of the shading unit 107. The abscissa plots the pixel position in the main scan direction, and the ordinate plots the signal value (8-bit read luminance value) output from the scanner 102 and the corresponding reflection density.

Shading correction reads a white plate or the like as a white reference placed in front of the read start position of the document 105 on the document table 501 (to be referred to as a "reference white plate" hereinafter) first. Note that the light amount of the light source 503 need be adjusted so as not to saturate the A/D conversion output.

As shown in FIG. 4, the signal values output from the scanner 102 exhibit variations. This is because the output from the photoelectric conversion element 502 includes variations for individual pixels. Even when a document with a uniform reflection density is read, the signal values do not become uniform. Hence, based on the signal values upon reading the reference white plate, the signal values of respective pixels are normalized by:

$$V(n) = S(n) \times V\mathrm{in}(n)$$

where

V(n) is the signal value after shading,

S(n) is a shading coefficient,

Vin(n) is the input value before shading, and suffix n represents the element number of the photoelectric conversion element 502.

Note that the shading coefficient S(n) is calculated to correct the signal value Vin corresponding to the reflection density of the reference white plate to V=255. As a result of such shading correction, the read luminance values upon reading the reference white plate are uniformly adjusted to 255, and variations for respective pixels of the photoelectric conversion element 502 are absorbed, as shown in FIG. 5.

[Hold Density Difference Between Lower Density Region and Background]

Figure 6:
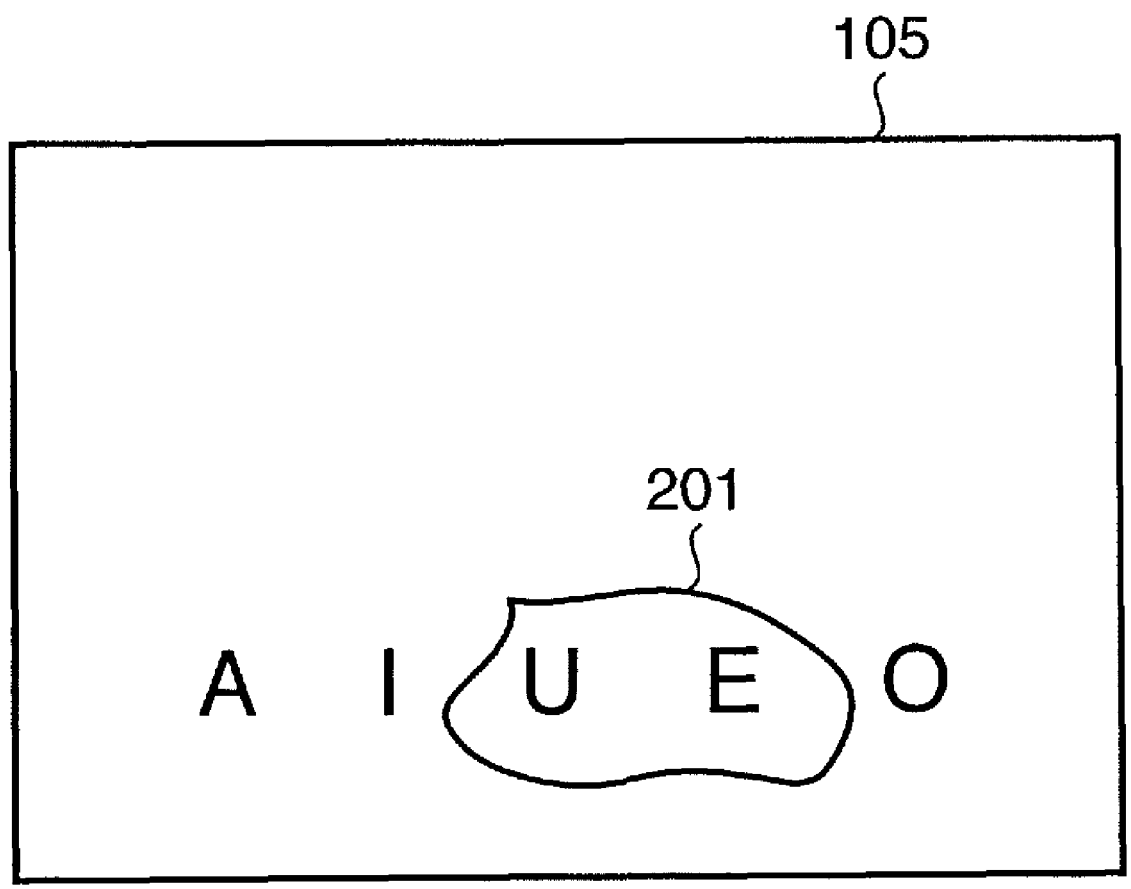
FIG. 6 shows an example of a document.

FIG. 6 shows an example of the document 105.

A print sheet of the document 105 is white paper having a reflection density of 0.08 equivalent to that of plain paper used in a copying machine or page printer, and is written with a character string "AIUEO" with a sufficiently high density. A commercially available correcting liquid is applied to a region 201, and letters "U" and "E" are written on that region. The region 201 is a lower density region having a reflection density of about 0.04 according to the experimental results of the present inventors.

Figure 7:
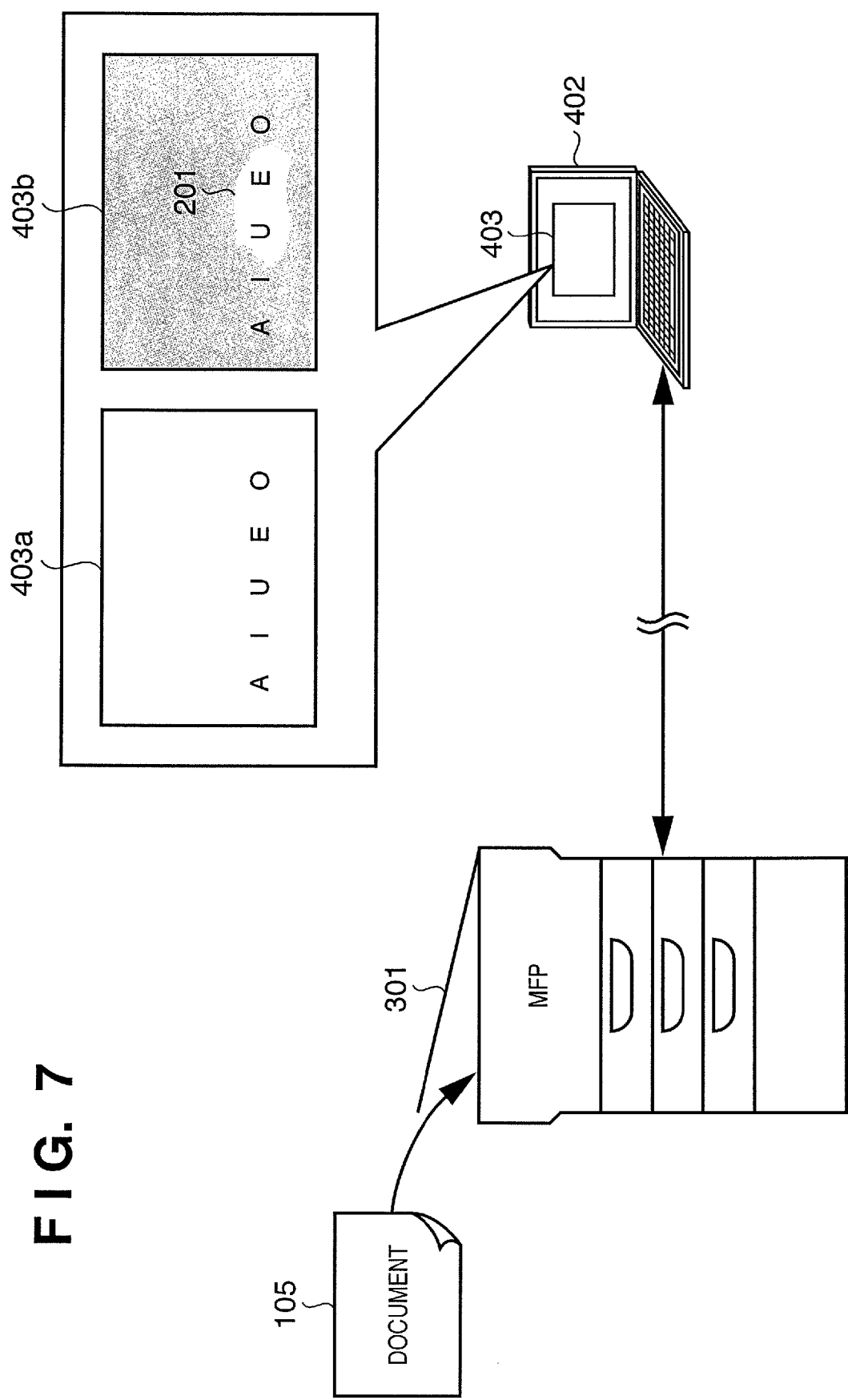
FIG. 7 shows an example of an electronic document which is generated by reading a document by the MFP and is displayed on the monitor of a PC.

FIG. 7 shows an example of an electronic document 403 which is generated by reading the document 105 by the MFP 301 and is displayed on the monitor of a PC 402. Note that the MFP 301 and PC 402 are connected via a network or via the external I/F 307.

Upon reading the document 105 shown in FIG. 6, an electronic document denoted by reference numeral 403a is generated if the read image data undergoes shading correction based on the read data of the reference white plate. That is, by setting the shading coefficients S(n) so that a reflection density of 0.08 corresponds to a read luminance value of 255, both the lower density region 201 and background have a read luminance value of 255. In this case, the density difference between the lower density region 201 and background disappears as a result of electronic document conversion.

Figure 8:
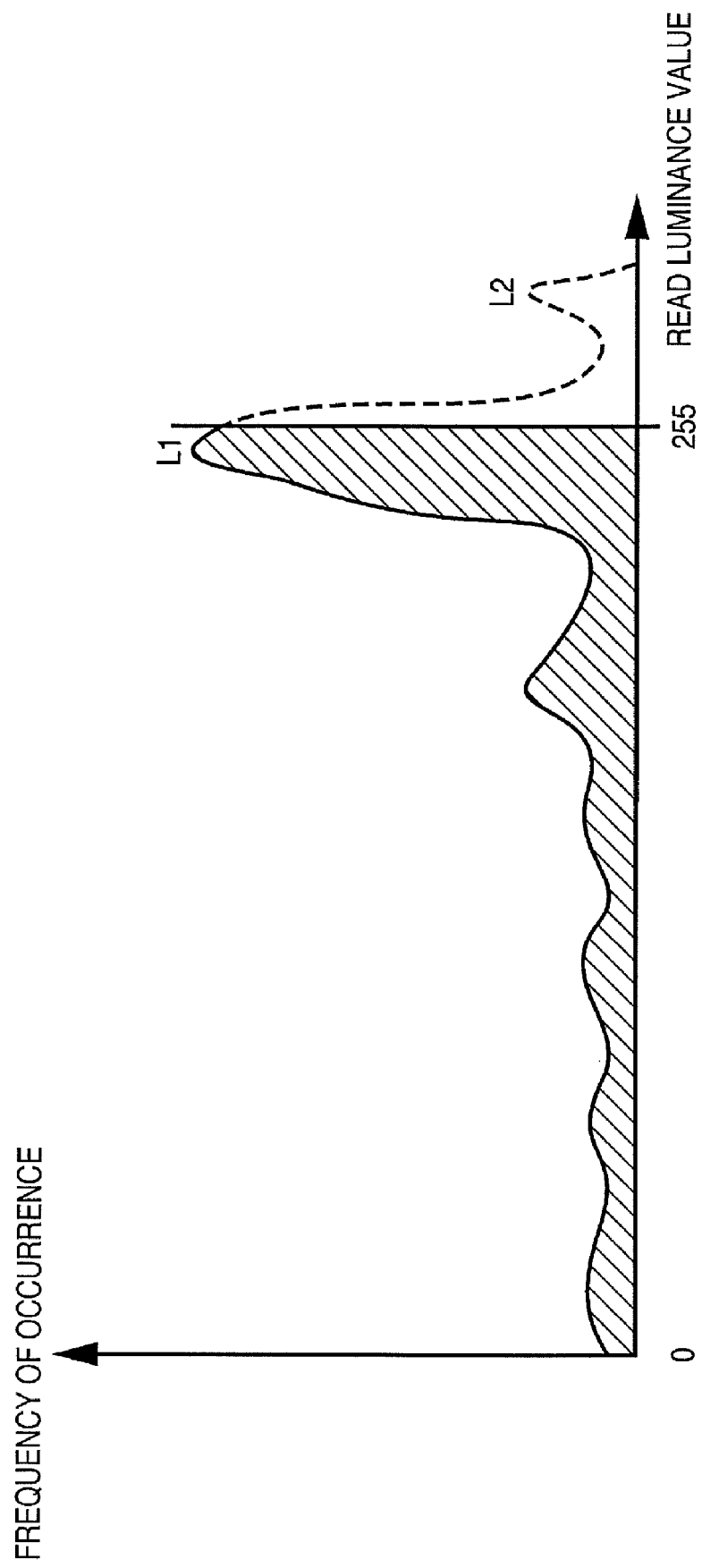
FIG. 8 shows the histogram of read luminance values after shading correction of a document.

FIG. 8 shows the histogram of the read luminance values of the document 105 after shading correction. The signal values of the background that occupies most of the document 105 have high frequencies of occurrence, and exhibit a distribution indicated by symbol L1. That is, using the shading coefficients based on the read data of the reference white plate, signals of a luminance region, which originally exists, as indicated by symbol L2, i.e., the read luminance values of the lower density region 201 applied with the correcting liquid saturate to 255. Note that the same features indicated by symbols L1 and L2 on the histogram are obtained both when the histogram is generated based on the entire region of the document 105 and when the histogram is generated for one scan including the lower density region 201.

Figure 9:
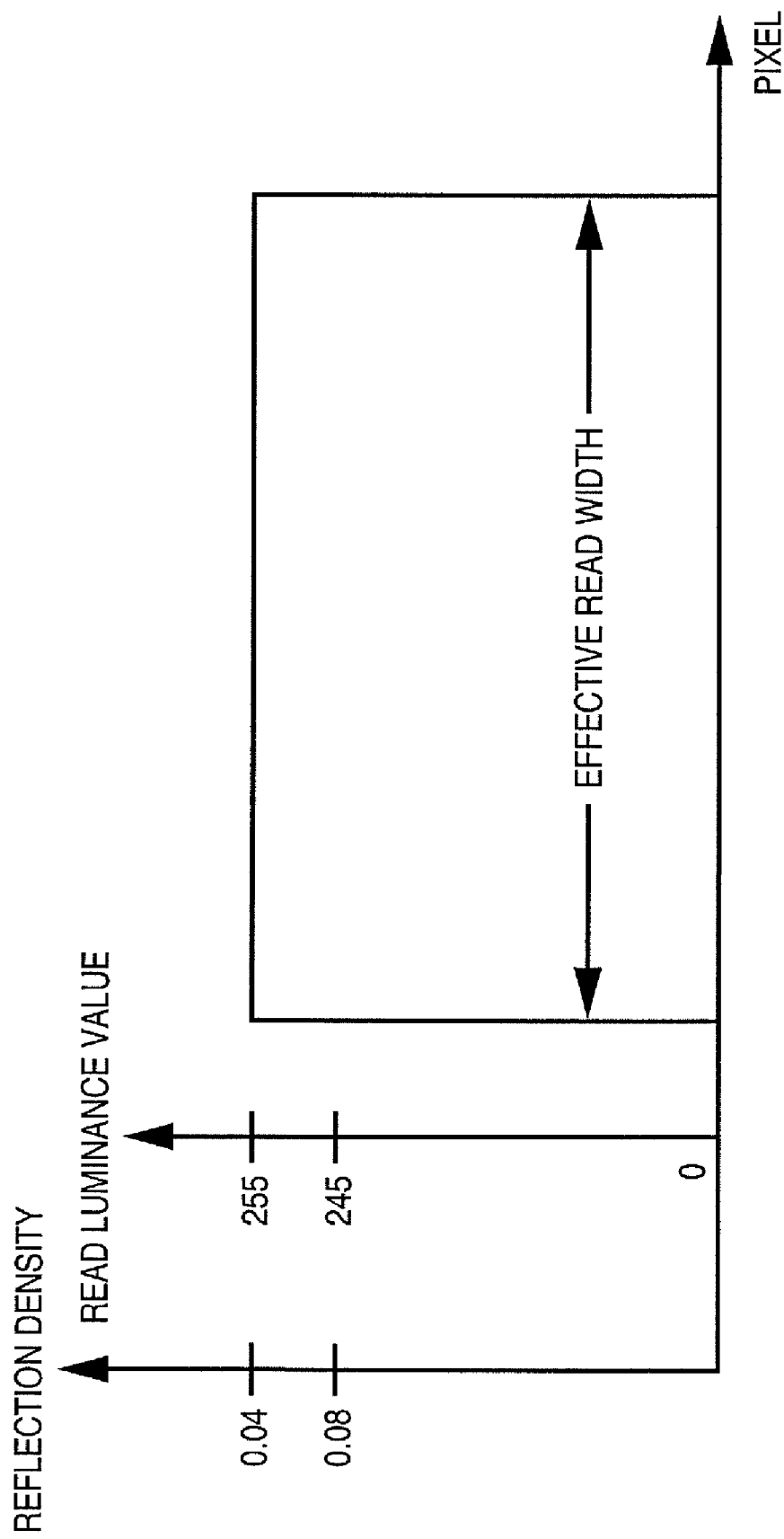
FIG. 9 is a view for explaining the processing of the shading unit.

In order to generate an electronic document while leaving the density difference between the lower density region 201 and background intact, the shading coefficients S(n) can be calculated so that a reflection density of 0.04 corresponds to a read luminance value of 255. Then, shading characteristics shown in FIG. 9 can be obtained: the reflection density of about 0.04 of the lower density region 201 corresponds to a read luminance value of 255, and the reflection density of about 0.08 of the background corresponds to a read luminance value of about 245. Therefore, an electronic document which holds the density difference between the lower density region 201 and background, as denoted by reference numeral 403b in FIG. 7, can be generated.

Figure 10:
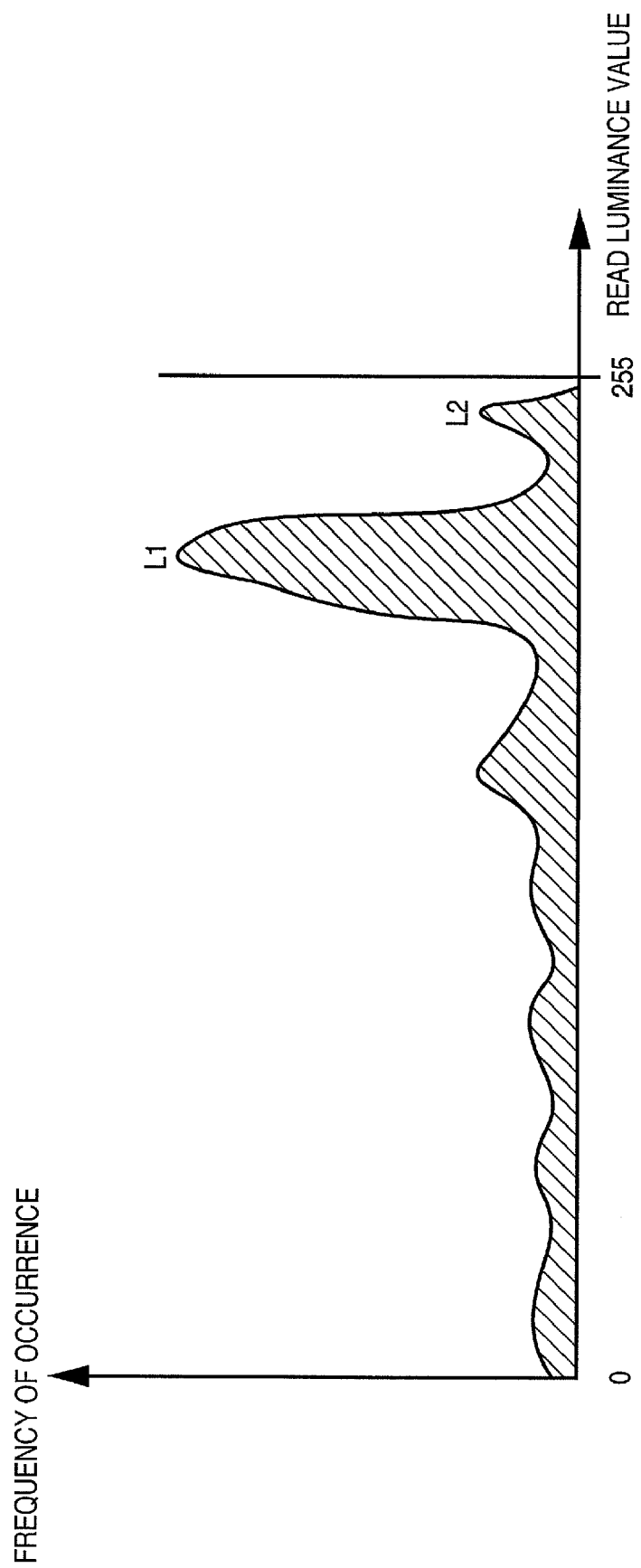
FIG. 10 shows the histogram of read luminance values upon executing shading correction of a document based on the reflection density of a region applied with a correcting liquid.

FIG. 10 shows the histogram of the read luminance values upon applying shading correction to the document 105 based on the reflection density of 0.04 of the region applied with the correcting liquid. Compared to the histogram shown in FIG. 8, the dynamic range of the read luminance signals includes the luminance region indicated by symbol L2. Note that the same features indicated by symbols L1 and L2 on the histogram are obtained both when the histogram is generated based on the entire region of the document 105 and when the histogram is generated for one scan including the lower density region 201.

[Detection of Lower Density Region]

Figure 12:
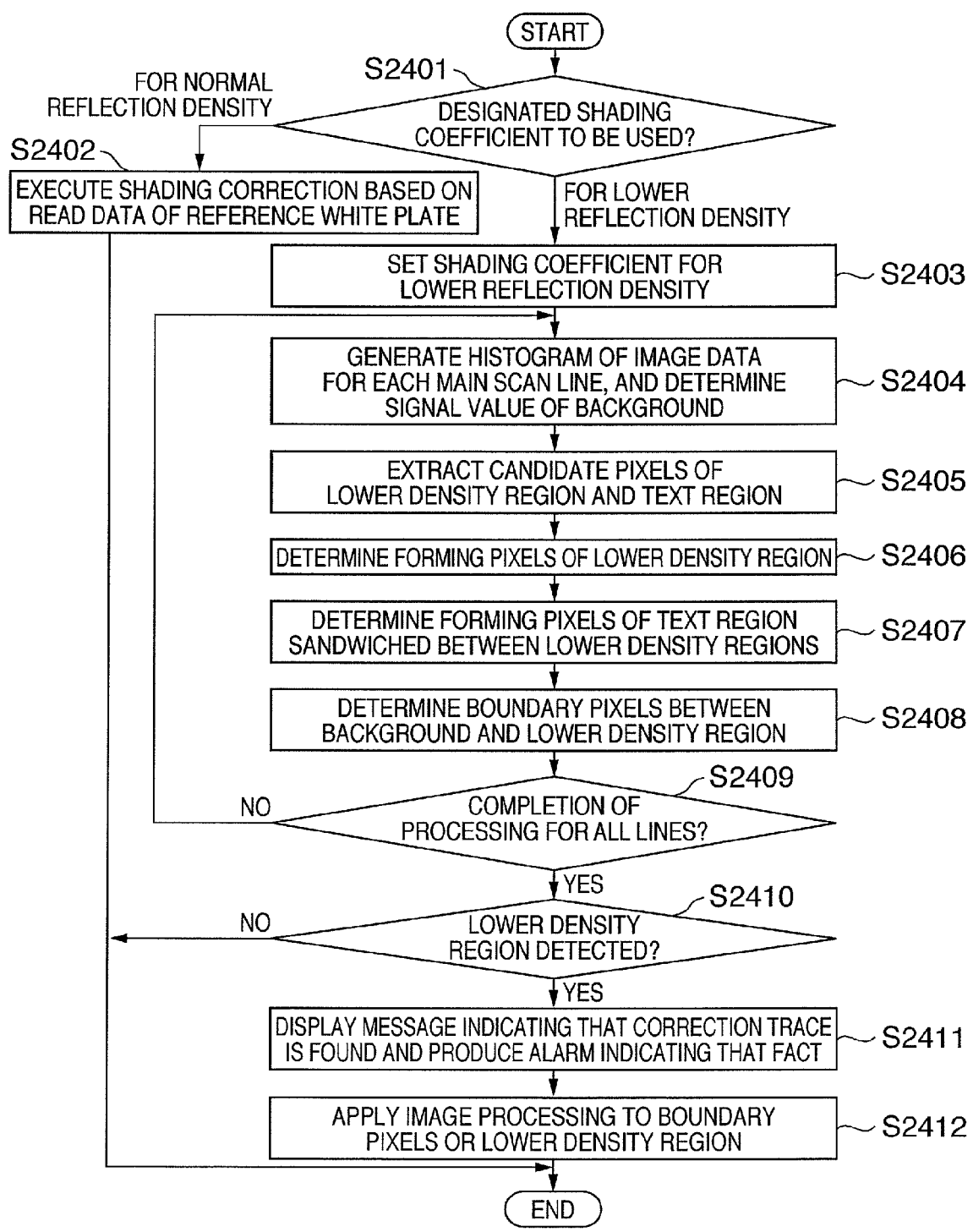
FIG. 12 is a flowchart for explaining detection and processing of a lower density region.

FIG. 12 is a flowchart for explaining detection and processing of a lower density region. The CPU 304 executes this processing (corresponding to the lower density region detection unit 108 and lower density region processing unit 109). Note that mj indicating the luminance threshold of a character and line image, Nld indicating the threshold of the number of pixels, and a threshold Nmj are set in advance to detect a lower density region. These thresholds are read out from the ROM 310, and are stored in the work area of the storage unit 305 when they are used.

The operator places the document 105 on the document table 501 of the scanner 102 (or sets the document 105 on an automatic document feeder). The operator operates the read method designation key 1901 on the console 104 to designate shading coefficients S corresponding to either of a background reflection density (to be referred to as a "normal reflection density" hereinafter) or a reflection density of the correcting liquid applied region (to be referred to as a "lower reflection density" hereinafter) upon reading the document 105. When the operator presses the start key 1902, the read operation of the document 105 starts. FIG. 12 shows the subsequent processing.

The CPU 304 determines if the operator designates the shading coefficients S corresponding to the normal or lower reflection density (S2401). If the operator designates reading based on the normal reflection density, the CPU 304 controls the white reference change unit 106 to make the shading unit 107 execute shading correction based on the read data of the reference white plate (S2402), thus ending the processing.

On the other hand, if the operator designates reading based on the lower reflection density, the CPU 304 controls the white reference change unit 106 to set the shading coefficients S for the lower reflection density in the shading unit 107 (S2403). The shading unit 107 sequentially applies shading correction using the shading coefficients S for the lower reflection density to image data input from the scanner 102.

Figure 13:
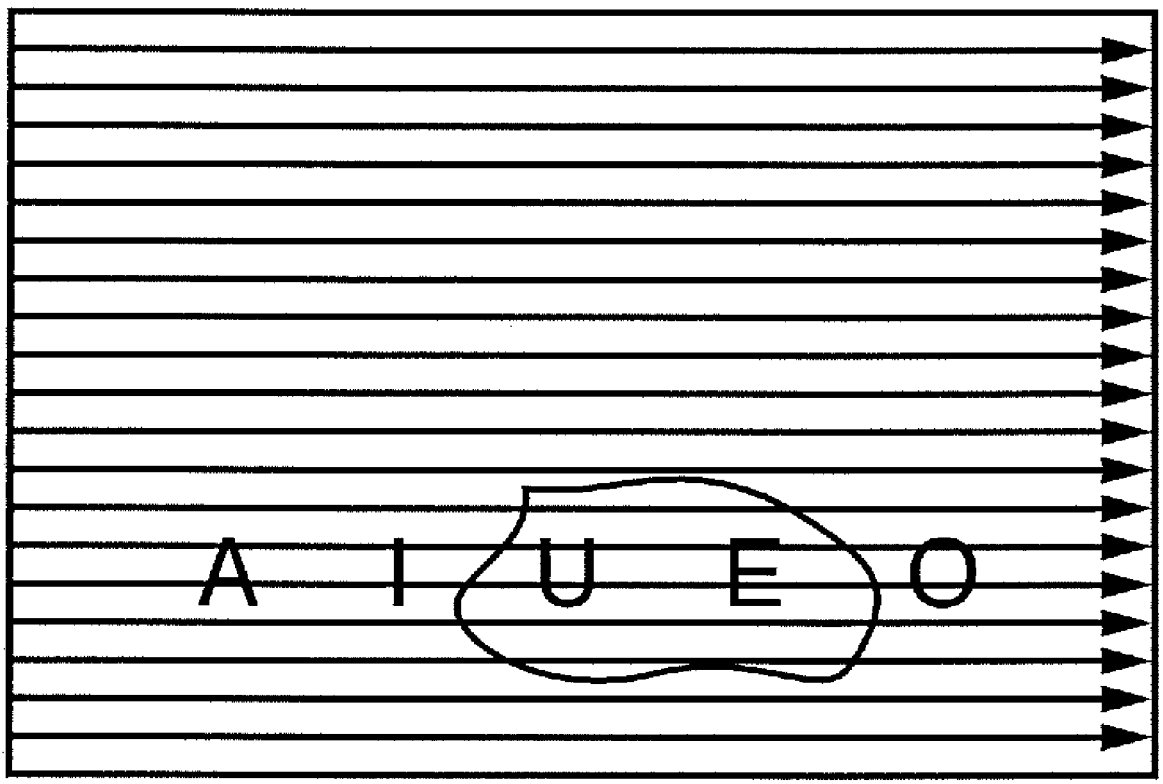
FIG. 13 is a view for explaining buffering of image data.

The CPU 304 stores the shading-corrected image data in a line buffer area in the storage unit 305 for each main scan line, as shown in FIG. 13, and generates a histogram shown in FIG. 10. Then, the CPU 304 determines a signal value which has a highest frequency of occurrence as that of the background, and decides a threshold bg (S2404).

Figure 14:
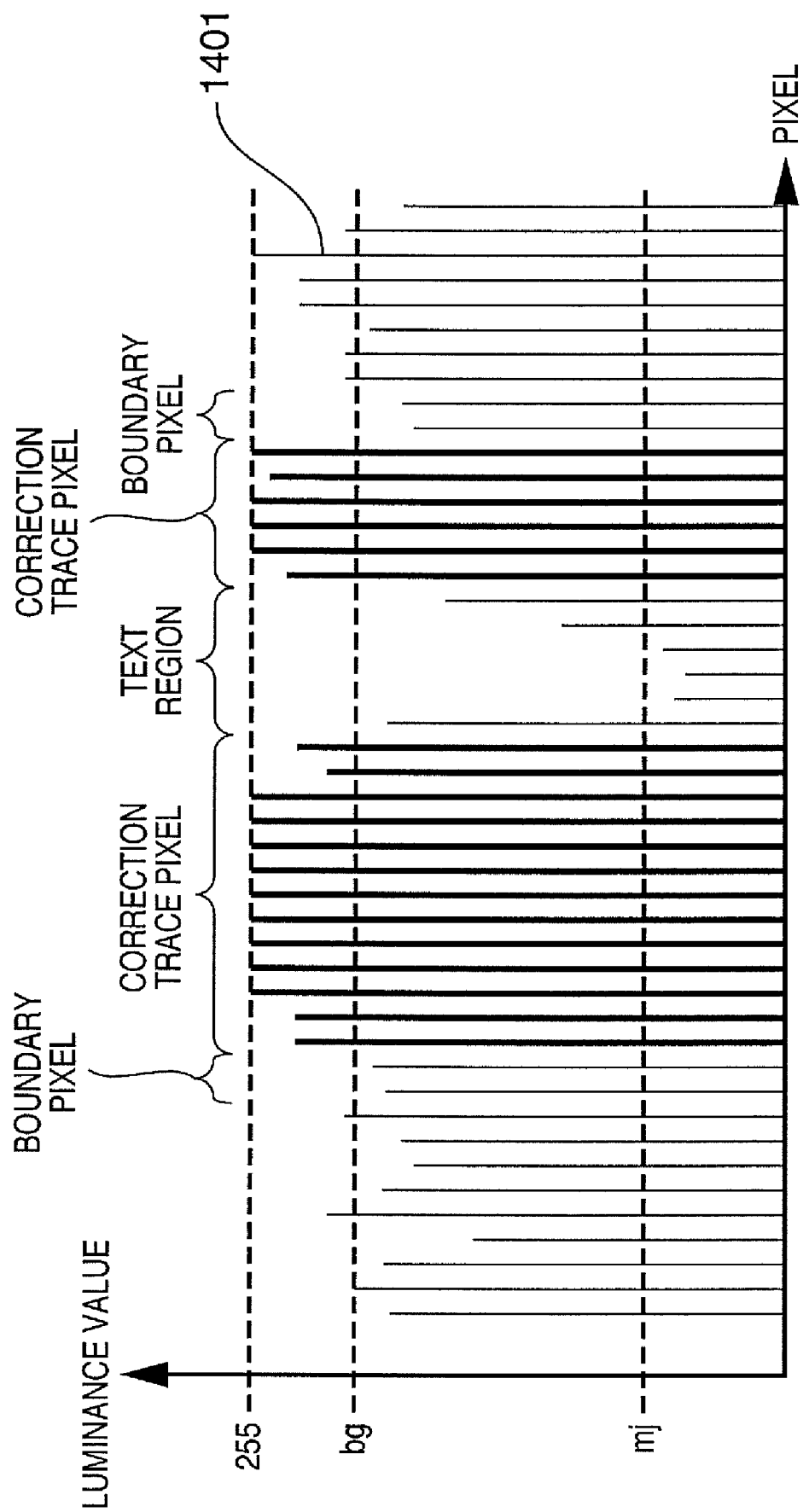
FIG. 14 shows the pixel values of respective pixels of a lower density region stored in a line buffer area under the assumption that a document includes the lower density region, and characters and lines with a high reflection density are written in that region.

FIG. 14 shows the signal values of respective pixels of the lower density region 201 under the assumption that the document 105 includes a lower density region, and characters and lines with a high reflection density are written in that region.

Let n be the pixel number, and P(n) be the signal value of an arbitrary pixel. Then, the CPU 304 extracts a pixel which meets $P(n) \geq bg$ as a candidate pixel of the lower density region 201. Also, the CPU 304 extracts a pixel which meets $P(n) \geq mj$ as a candidate pixel of a text region based on the threshold mj (e.g., about 20) which is set to sufficiently extract a character with a high reflection density (S2405). Note that the threshold mj depends on the dark signal characteristics of the photoelectric conversion element 502, and is preferably adjusted in accordance with the dark signal characteristics of the photoelectric conversion element 502 adopted in the scanner 102.

The CPU 304 counts a run of candidate pixels of the lower density region 201. If a count value $c \geq Nld$, the CPU 304 determines these candidate pixels as forming pixels of the lower density region 201 (S2406). FIG. 14 shows a case of Nld=5, and the CPU 304 does not determine pixels that locally exist and meet $P(n) \geq bg$ such as pixels denoted by reference numeral 1401 and the like as forming pixels of the lower density region 201.

The CPU 304 counts the number of candidate pixels (P(n) $\leq mj$) of a text region sandwiched between lower density regions 201. If a count value $c \geq Nmj$, the CPU 304 determines these candidate pixels and pixels that are located before and after these pixels and are less than the threshold bg as forming pixels of characters in the lower density region 201 (S2407). FIG. 14 shows a case of Nmj=3.

The CPU 304 determines pixels at a boundary outside the determined lower density region 201 as boundary pixels between the background and lower density region 201 (S2408). In this case, the CPU 304 adopts several pixels to set a width that can be sufficiently visually recognized with respect to the resolution of the scanner 102. FIG. 14 shows an example in which two pixels are adopted as boundary pixels.

The CPU 304 executes the processes in steps S2404 to S2408 for all the main scan lines based on the checking result in step S2409.

If the aforementioned processes are complete for all the lines, the CPU 304 checks if the read image includes a lower density region 201 (S2410). If the read image does not include any lower density region 201, the CPU 304 skips the processing of the lower density region 201, and passes the read image to the read image processor 103, thus ending the processing.

On the other hand, if the read image includes a lower density region 201, the CPU 304 displays a message indicating that the lower density region 201, i.e., a modification region using the correcting liquid is found in the read image on the display unit 110 of the console 104, as shown in FIG. 15. At the same time, the CPU 304 produces an alarm indicating that the modification region is found using the loudspeaker 111 (S2411). Note that the CPU 304 need not execute both the display using the display unit 110 and the alarm using the loudspeaker 111, and may execute either one of them. Also, the alarm using the loudspeaker 111 may use a beep tone or the like or a voice.

The CPU 304 applies image processing to the boundary pixels or lower density region 201 based on the detection result of the modification region (S2412), and passes the processed read image to the read image processor 103, thus ending the processing. This image processing replaces the luminance values of the boundary pixels to those of gray or to those of red or blue with a higher saturation value that can be easily visually recognized. Or the image processing colors the lower density region 201 in gray or pale color.

Figure 16:
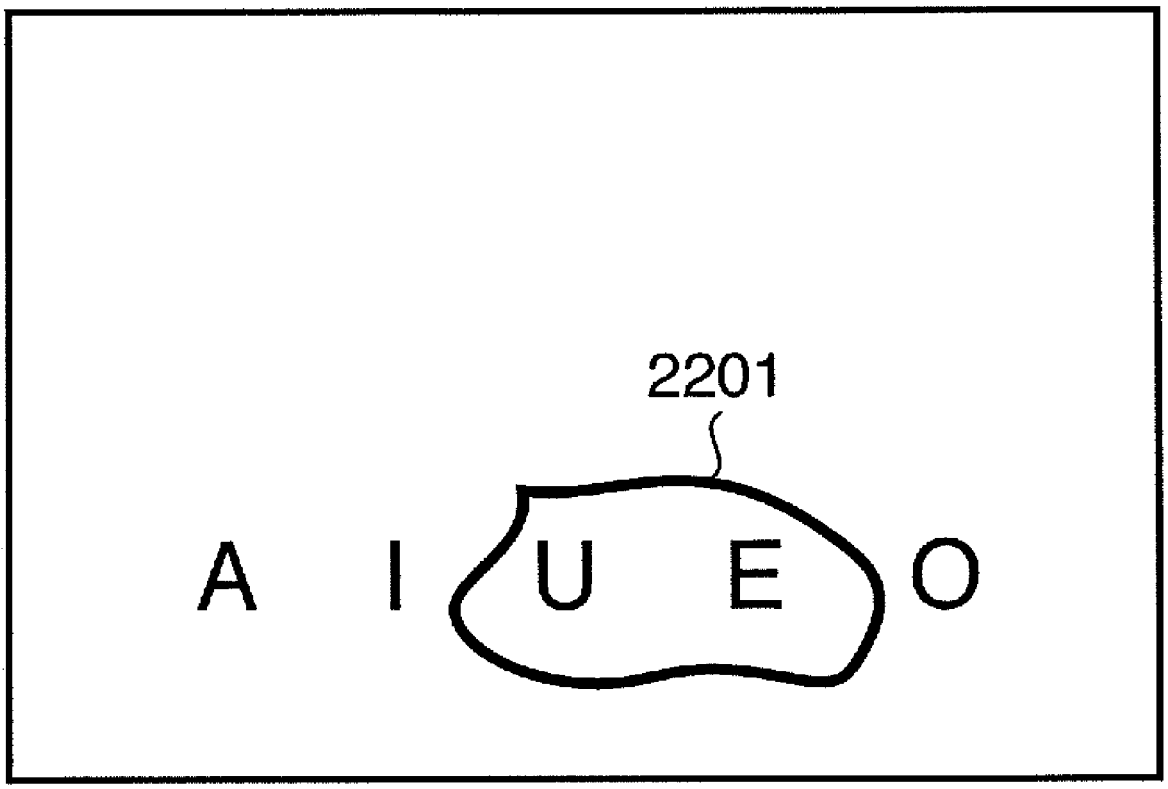

With the above processing, upon reading the document 105 shown in FIG. 6, an electronic document shown in FIG. 16 can be generated. The electronic document shown in FIG. 16 is an example which holds the density difference between the background and a lower density region 2201, and shows the boundary between the background and the lower density region 2201 in gray. When the lower density region 2201 is colored, letters "U" and "E" in that region and the boundary need not particularly be processed.

The image processing of the lower density region 201 may be omitted. In such case, an electronic document shown in FIG. 17 is generated. The electronic document shown in FIG. 17 holds the density difference between the background and a lower density region 2101. The operator can recognize the presence of the lower density region in the generated electronic document by the display on the display unit 110 or alarm using the loudspeaker 111.

Figure 18:
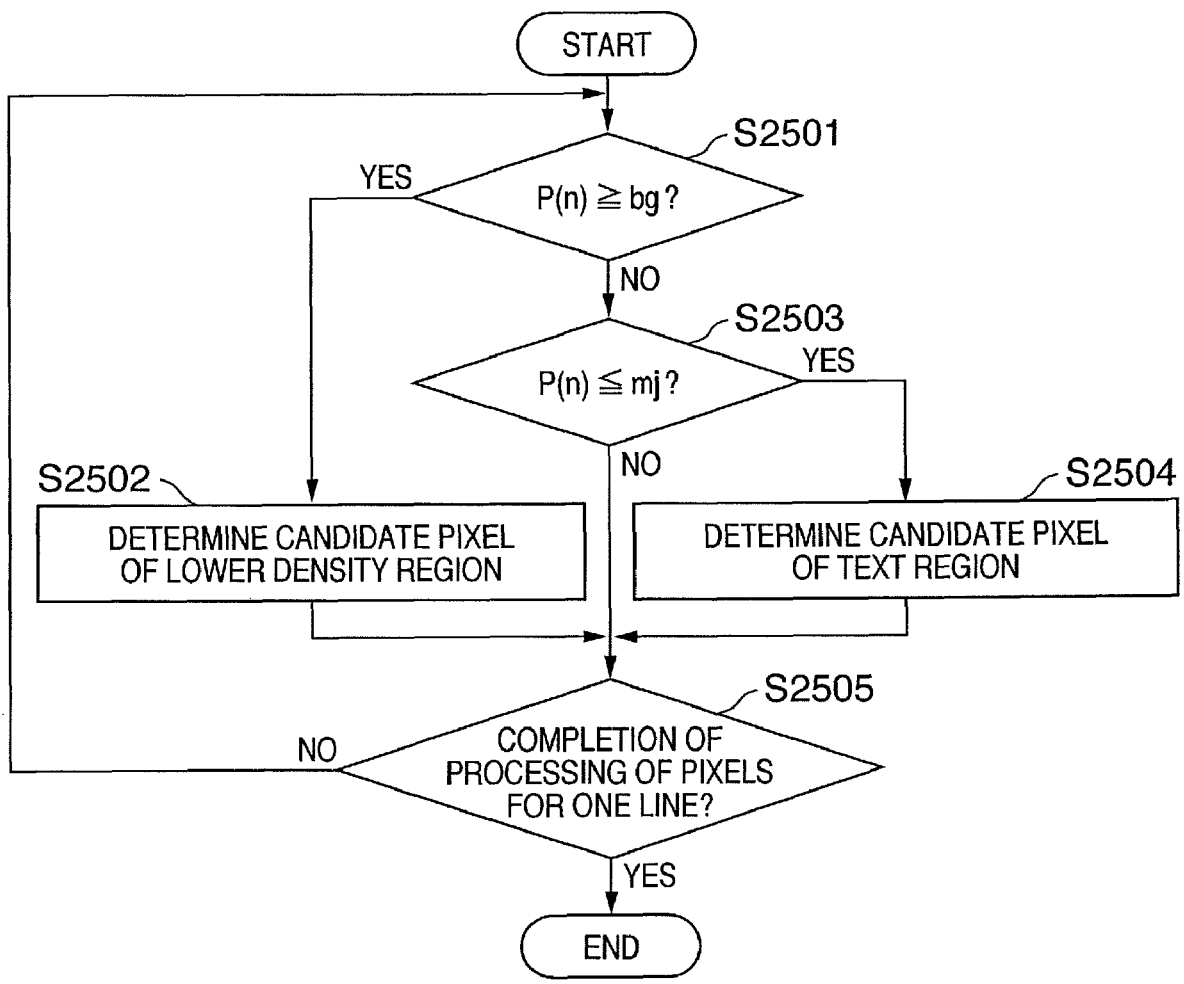
FIG. 18 is a flowchart showing details of the processing in step S2405 for one line.

FIG. 18 is a flowchart showing details of the processing in step S2405 for one line.

The CPU 304 loads a pixel value P(n) of the first pixel in the line buffer area to check if it satisfies the first condition P(n)≧bg (S2501). If the pixel value of interest satisfies the first condition, the CPU 304 determines the pixel of interest as a candidate pixel of the lower density region 201 (S2502). If the pixel value of interest does not satisfy the first condition, the CPU 304 checks if it satisfies the second condition P(n)≦mj (S2503) If the pixel value of interest satisfies the second condition, the CPU 304 determines the pixel of interest as a candidate pixel of the text region (S2504).

The CPU 304 repeats steps S2501 to S2504 until it is determined in step S2505 that the aforementioned processing is completed for pixels for one line.

Figure 19:
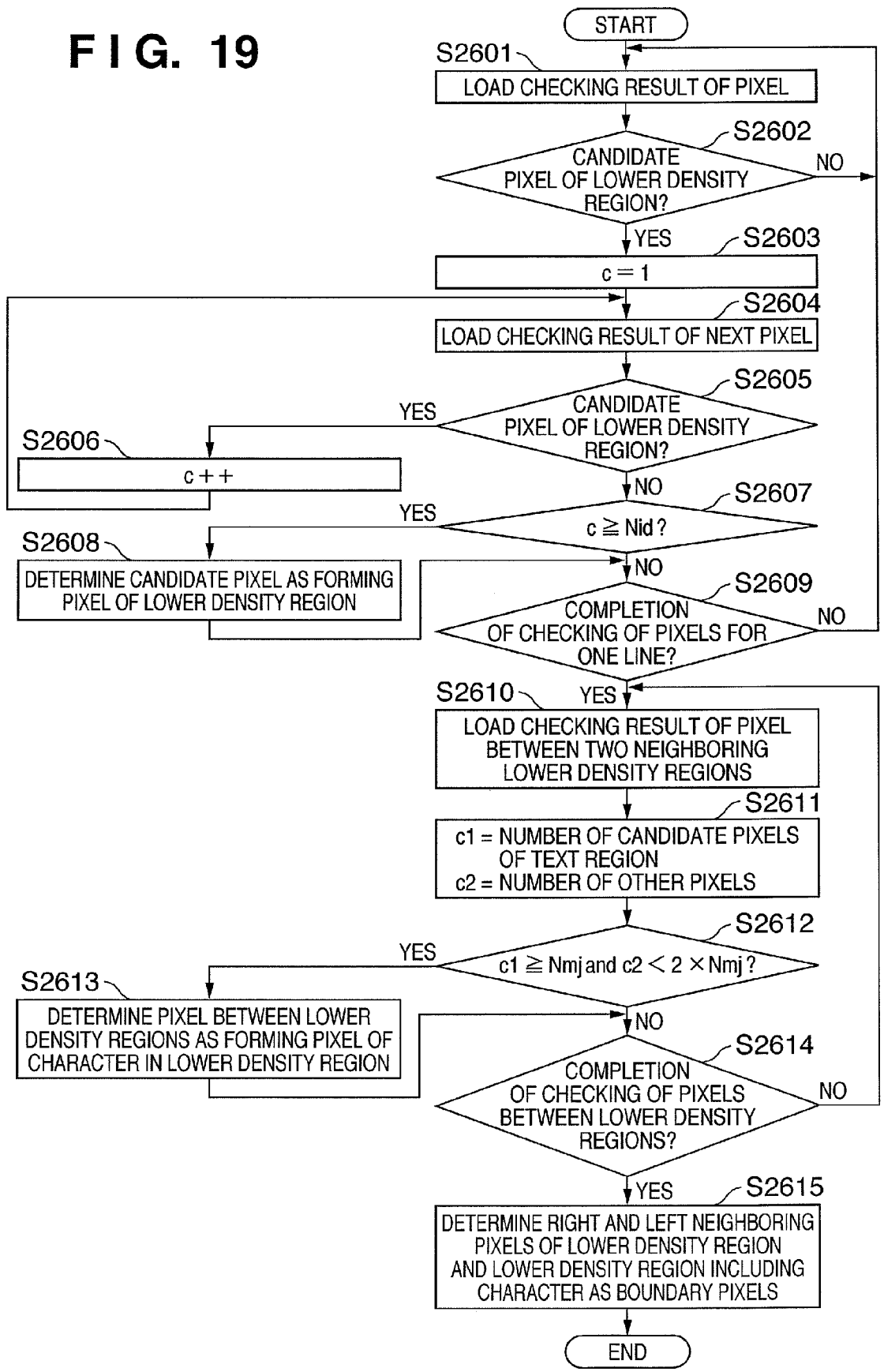
FIG. 19 is a flowchart showing details of the processing in steps S2406 to S2408.

FIG. 19 is a flowchart showing details of the processing in steps S2406 to S2408.

The CPU 304 loads the checking result from the first pixel of one line (S2601), and checks if the pixel of interest is a candidate pixel of the lower density region 201 (S2602). The CPU 304 repeats steps S2601 and S2602 until a candidate pixel of the lower density region 201 appears.

If a candidate pixel of the lower density region 201 appears, the CPU 304 resets the count value c to "1" (S2603) to load the checking result of the next pixel (S2604), and checks if the pixel of interest is a candidate pixel of the lower density region 201 (S2605). If the pixel of interest is a candidate pixel of the lower density region 201, the CPU 304 increments the count value c (S2606), and the process returns to step S2604. If the pixel of interest is other than a candidate pixel of the lower density region 201, the CPU 304 compares the count value c and the threshold Nld (S2607). If c≧Nld, the CPU 304 sets these candidate pixels as forming pixels of the lower density region 201 (S2608).

The CPU 304 repeats steps S2601 to S2608 until checking of pixels for one line is completed. Although not shown in FIG. 19, if forming pixels of the lower density region 201 are not found, the processing ends.

The CPU 304 loads the checking results of pixels between two neighboring lower density regions 201 (S2610), and sets the number of candidate pixels of the text region in a count value c1 and those of other pixels in a count value c2 (S2611). The CPU 304 compares the count values c1 and c2 with the threshold Nmj (S2612). If c1≧Nmj and c2≦2×Nmj, the CPU 304 determines the pixels between the two neighboring lower density regions 201 as forming pixels of a character in the lower density region 201 (S2613).

If the aforementioned condition is not met (c1<Nmj or c2≧2×Nmj), the CPU 304 determines that pixels between the lower density regions 201 are not those which form a character in the lower density region 201. In other words, the CPU 304 determines that the two lower density regions 201 to be checked form an independent lower density region 201. Note that in the above example, both c1 and c2 use the threshold Nmj. However, the present invention is not limited to this, and values suited to check the forming pixels of a character in the lower density region 201 may be set as thresholds for c1 and c2.

In some cases, the CPU 304 may determine pixels between given lower density regions 201 as forming pixels of a character in the lower density region 201, and also determine those between one of the former lower density regions 201 and the next lower density region 201 as forming pixels of a character in the density region 201. In this case, the CPU 304 can determine that these (three in this example) lower density region 201 form one lower density region 201.

The CPU 304 repeats steps S2610 to S2613 until it is determined in step S2614 that checking for pixels between the lower density regions 201 that exist in one line is completed.

Next, the CPU 304 determines right and left neighboring pixels of the lower density region 201 and that including a character as boundary pixels (S2615). Note that the forming pixels of a character included in the lower density region 201 need not be set as boundary pixels. The boundary pixel may be one pixel. However, it is preferable to set the number of pixels for a width that can be sufficiently visually recognized with respect to the resolution of the scanner 102. For example, one pixel at 600 dpi is about 42 μm, and if 0.2-mm wide boundary pixels are set, about five pixels are required.

[Application]

Figure 20:
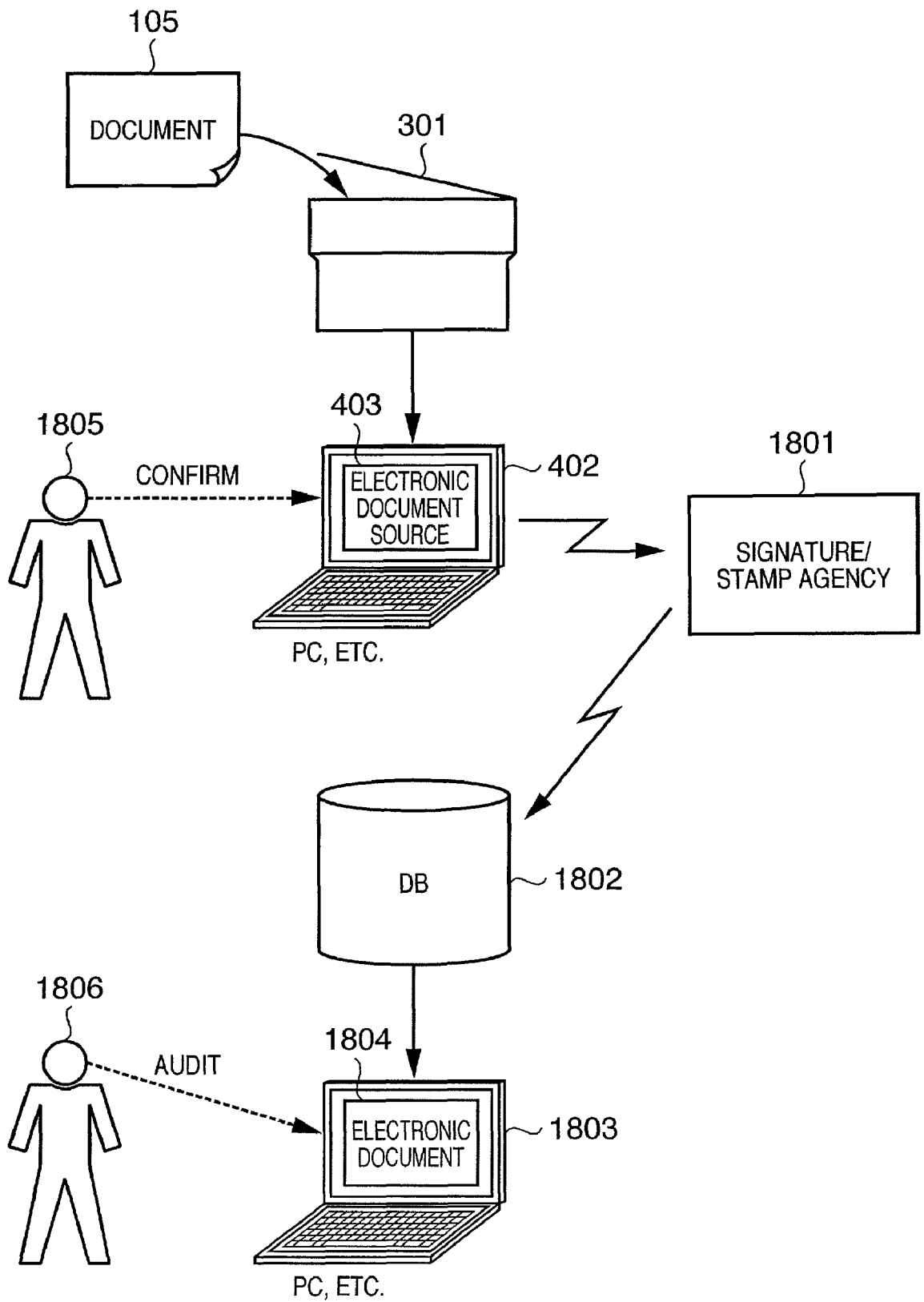
FIG. 20 shows an application example of an MFP having a detection function of a lower density region.

FIG. 20 shows an application example of the MFP 301 having a lower density region detection function.

An operator 1805 places the document 105 to be converted into an electronic document on the scanner 102 of the MFP 301, and operates the read method designation key 1901 on the console 104 to designate a read operation using the shading coefficients S for the lower reflection density.

The operator 1805 displays and observes an electronic document 403 generated by the above image processing on the monitor of the PC 402. In this case, if the number of documents 105 is large, visual detection of modification regions increases the load on the operator 1805, and oversights of modification regions may occur.

According to this embodiment, in case of the document 105 shown in FIG. 6, the MFP 301 produces an alarm indicating the presence of a modification region. Therefore, the operator need only visually confirm the alarmed modification region, whose boundary pixels are displayed in, e.g., gray, on the electronic document 403. As this processing, for example, a document including a modification region is determined as an invalid document, and is not converted into an electronic document, or it is confirmed with a creator or modifier of the document 105 about the process of modification to determine whether or not the document is to be converted into an electronic document.

The operator 1805 sends the electronic document to a signature/time stamp agency 1801 that issues a digital signature and a time stamp of electronic document conversion via, e.g., the network, so as to finally settle the electronic document. Note that the signature/time stamp agency 1801 is a public third-party organization. The signature/time stamp agency issues a signature and time stamp, and returns the electronic document embedded with them. The operator 1805 stores the electronic document embedded with them in a database (DB) 1802 as an official electronic document.

On the other hand, an auditor 1806 has an authority to audit the electronic document stored in the database 1802. More specifically, the auditor 1806 displays the electronic document stored in the database 1802 on the monitor of a PC 1803, and visually confirms an electronic document 1804 displayed on the monitor. If an electronic document including a modification region is stored in the database 1802 as an electronic document, the modification region has undergone image processing so that it is easy to find. Therefore, the auditor 1806 can easily and adequately find a document including a modification region from a volume of electronic documents.

In this manner, when a paper document has undergone modification, correction, or alteration using a correcting liquid, that modification region is detected, and an alarm indicating that fact is produced upon converting the paper document including the modification region into an electronic document. Therefore, the operator 1805 can take actions to call off electronic document conversion of the paper document including the modification region, to determine whether or not the paper document is to be converted into an electronic document, and so forth. Since the image processing for allowing easy confirmation of the modification region is applied, and the paper document is then converted into an electronic document, not only the operator 1805 and auditor 1806 but also all observers can easily recognize the modification region of the electronic document displayed on the monitor or the like.

Second Embodiment

Image processing according to the second embodiment of the present invention will be described below. Note that the same reference numerals in the second embodiment denote the same parts as in the first embodiment, and a detailed description thereof will be omitted.

The first embodiment has explained the method of buffering each main scan line, setting the threshold bg used to detect a lower density region by detecting a background signal value, and detecting the lower density region for each line. This method can assure excellent detection precision, but imposes a very heavy load on the CPU 304. Hence, the second embodiment will explain a detection method of a lower density region that can reduce the load on the CPU 304.

Figure 21:
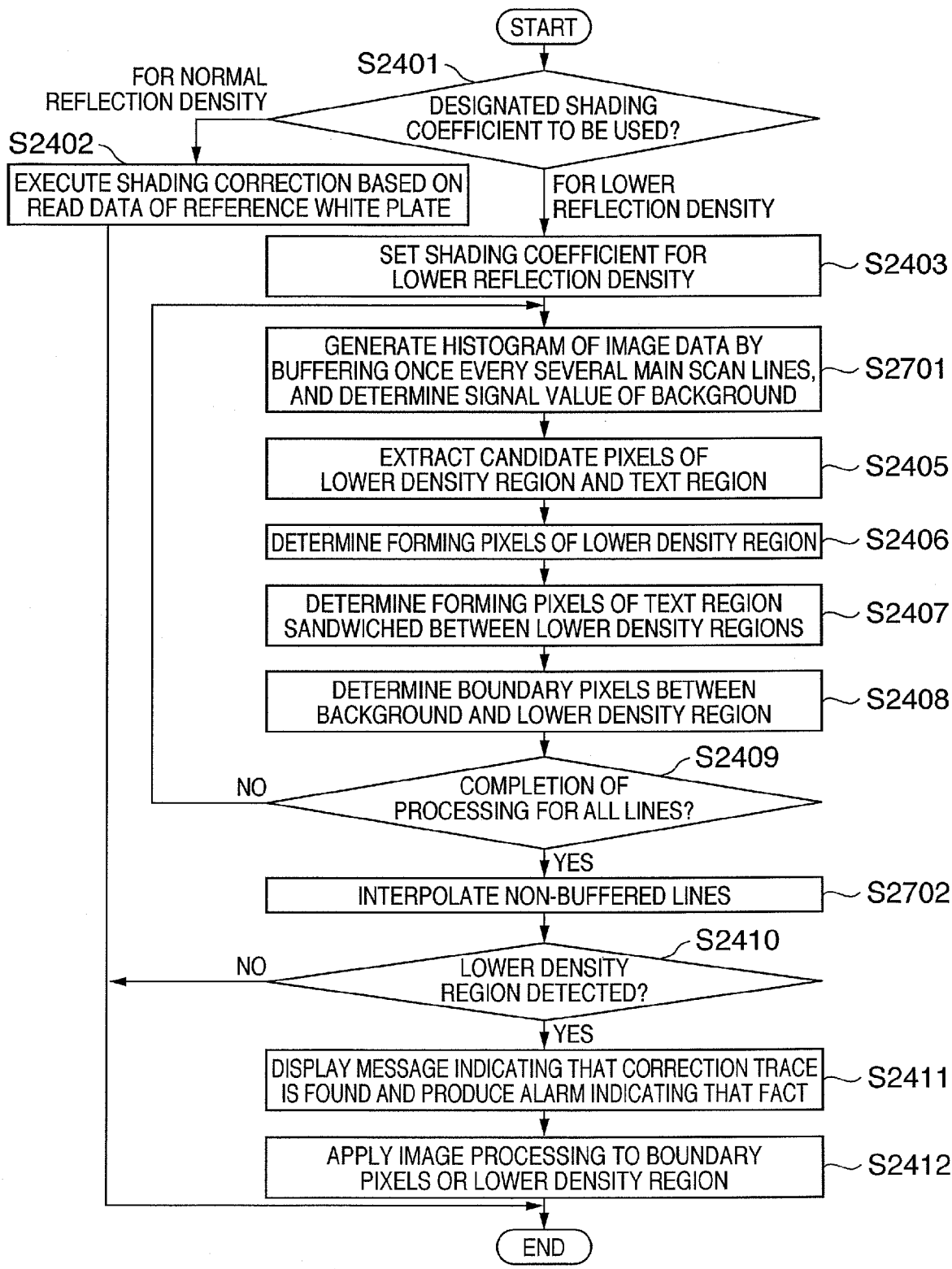
FIG. 21 is a flowchart for explaining detection and processing of a lower density region according to the second embodiment.

FIG. 21 is a flowchart for explaining detection and processing of a lower density region according to the second embodiment. The CPU 304 executes this processing (corresponding to the lower density region detection unit 108 and lower density region processing unit 109). Unlike in the processing of the first embodiment shown in FIG. 12, the CPU 304 buffers the shading-corrected image data once every several main scan lines to generate the histogram shown in FIG. 10 in step S2701. After completion of the processing of all the lines, the CPU 304 interpolates lines which are not buffered to interpolate a lower density region, text region, and boundary pixels.

In this manner, since image data is buffered once every several lines, the number of times of decision and processing in steps S2701 to S2409 is decreased, thus reducing the processing load on the CPU 304.

Third Embodiment

Image processing according to the third embodiment of the present invention will be described below. Note that the same reference numerals in the third embodiment denote the same parts as in the first and second embodiments, and a detailed description thereof will be omitted.

Even the method of detecting a lower density region and text region in the main scan direction described in the above embodiments can detect most of all lower density regions and text regions. However, if there is a narrow lower density region and text region in the sub-scan direction, the detection precision may lower by only the detection in the main scan direction. Hence, the third embodiment will explain a method of detecting in two directions, i.e., the main scan and sub-scan directions, as shown in FIG. 22.

Figure 23:
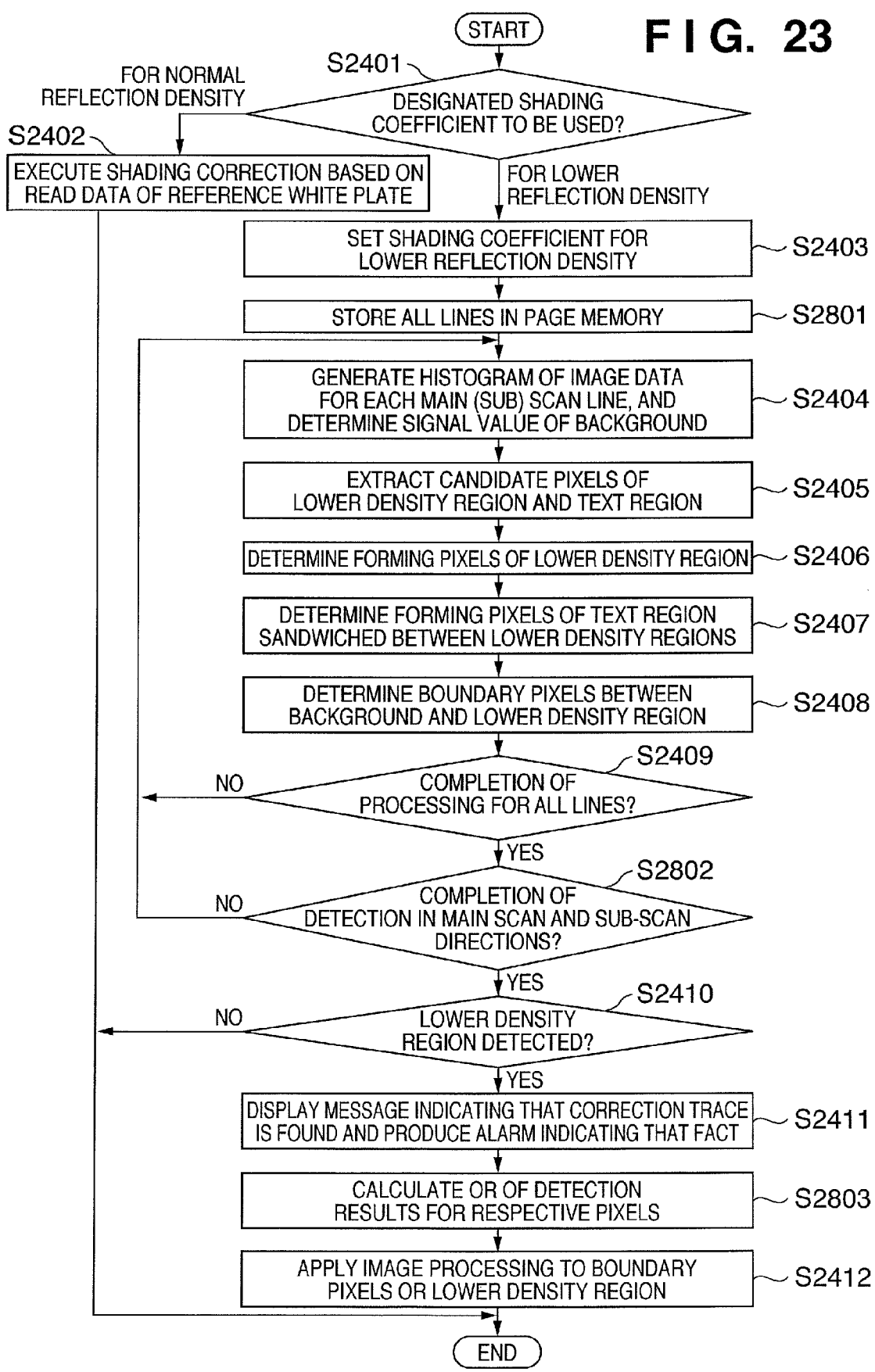
FIG. 23 is a flowchart for explaining detection and processing of a lower density region according to the third embodiment.

FIG. 23 is a flowchart for explaining detection and processing of a lower density region according to the third embodiment The CPU 304 executes this processing (corresponding to the lower density region detection unit 108 and lower density region processing unit 109). Unlike in the processing of the first embodiment shown in FIG. 12, the CPU 304 buffers all lines in a page memory assured on the storage unit 305 in step S2801. The CPU 304 reads out line by line from the page memory in the main scan direction, and performs detection of a lower density region and text region, and setting of boundary pixels (S2404 to S2409). Next, based on the checking result in step S2802, the CPU 304 performs similar detection and setting for each line in the sub-scan direction (S2404 to S2409). Furthermore, if a lower density region is found, the CPU 304 calculates the logical sums of the detection results and setting results for respective pixels in step S2803.

With this processing, even a narrow lower density region and text region in the sub-scan direction can be detected with high precision by detection in the sub-scan direction.

As in the second embodiment, the detection and setting may be made once every several lines in both the main scan and sub-scan directions, and the detection results and setting results of thinned lines may be interpolated, thus reducing the load on the CPU 304.

Fourth Embodiment

Image processing according to the fourth embodiment of the present invention will be described below. Note that the same reference numerals in the fourth embodiment denote the same parts as in the first to third embodiments, and a detailed description thereof will be omitted.

In the above embodiments, the reflection density of the correcting liquid applied surface is assumed to be 0.04 based on the measurement results of the present inventors. However, the reflection density may not be 0.04 depending on the materials of correcting liquids. Furthermore, the read luminance values may suffer variations due to aging of the light source 503 of the scanner 102 and the like. The fourth embodiment will explain a correction method of the shading coefficients S which have the correcting liquid applied surface as a target.

Figure 24:
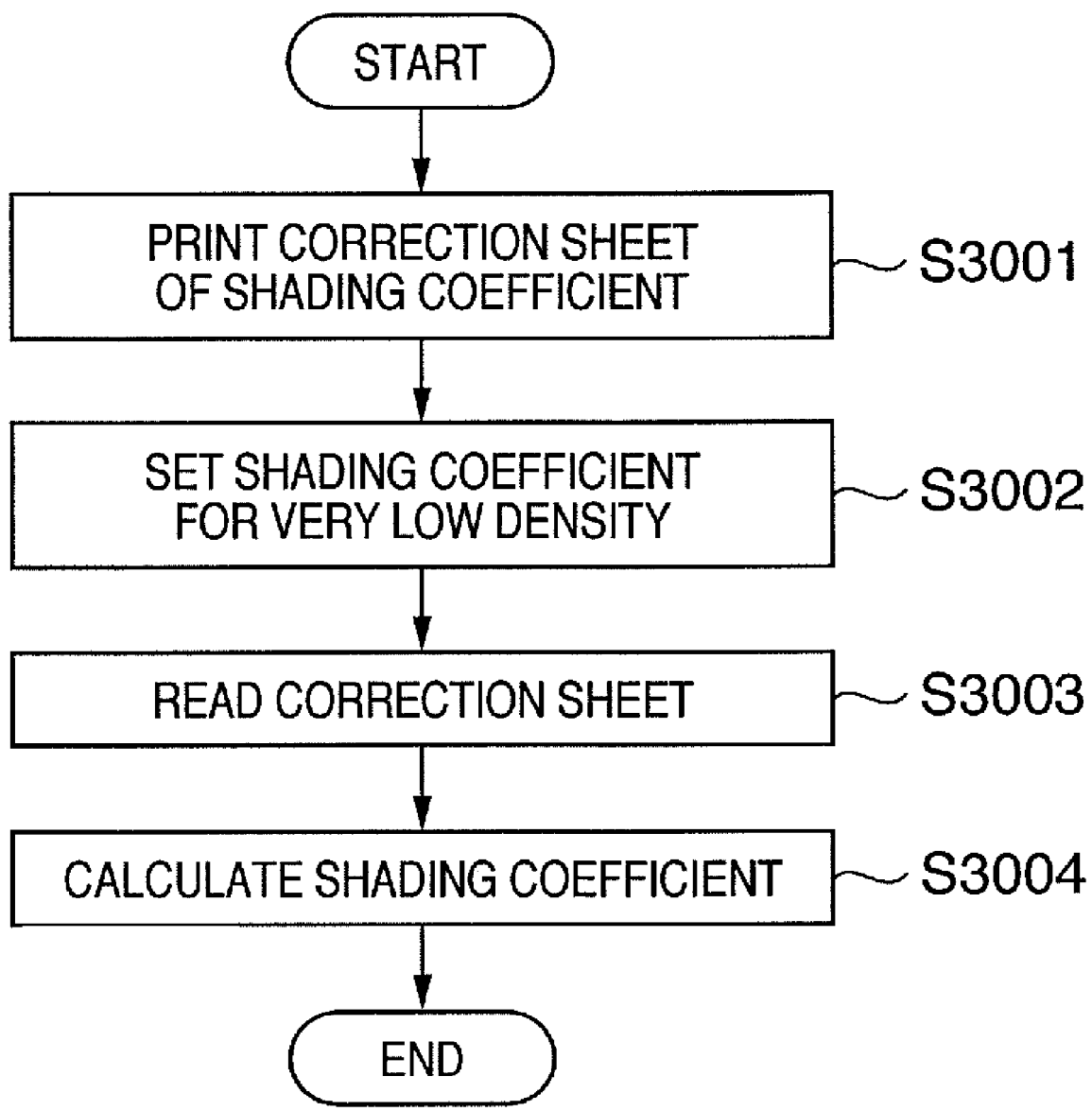
FIG. 24 is a flowchart showing correction processing of shading coefficients.

FIG. 24 is a flowchart showing the correction processing of the shading coefficients S. The CPU 304 executes this processing.

The operator instructs correction of the shading coefficient S by operating the console 104. In response to this instruction, the CPU 304 prints a correction sheet 1201 using the printer 303 (S3001).

Figure 25:
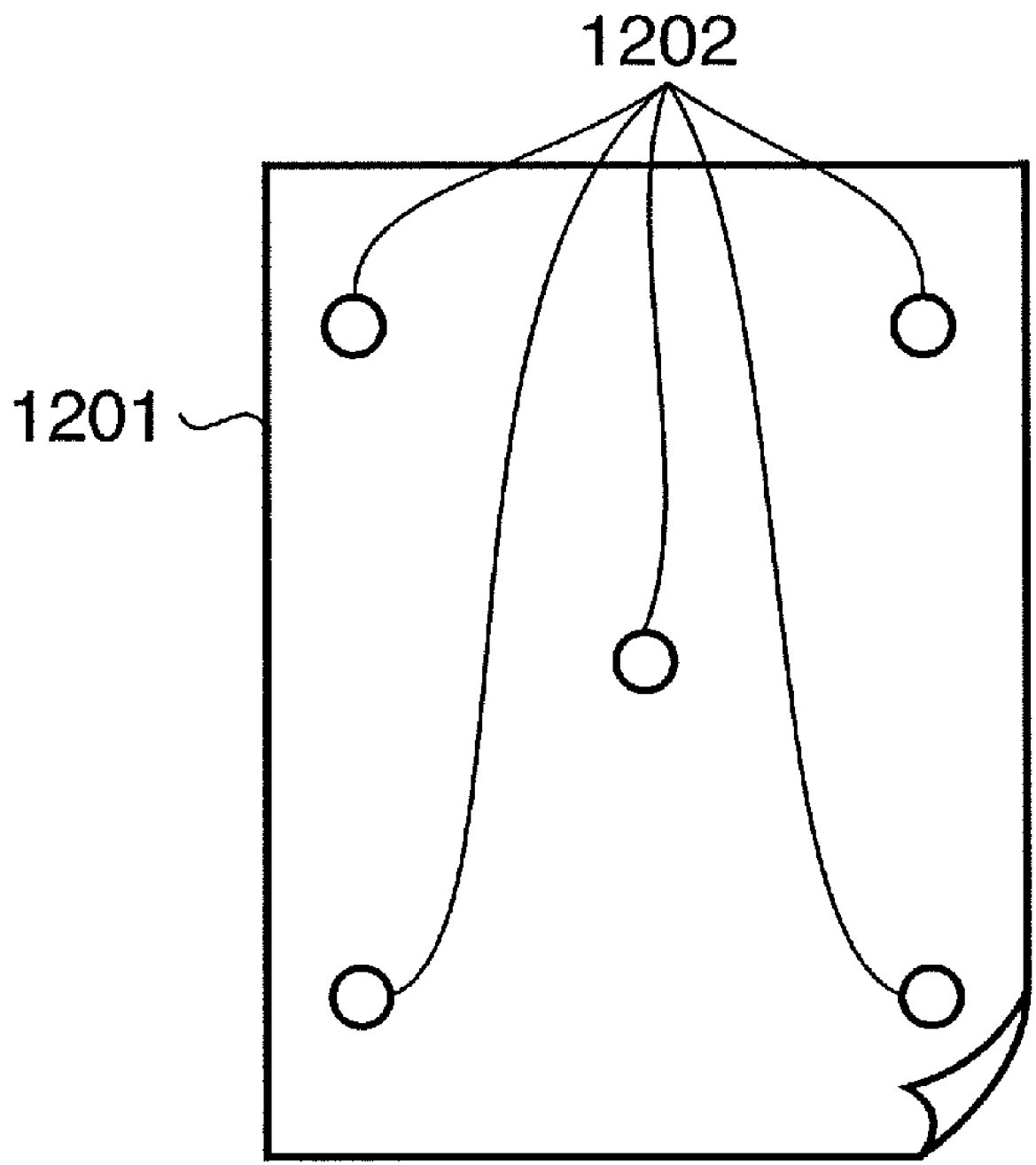
FIG. 25 is a view for explaining a correction sheet.

FIG. 25 is a view for explaining the correction sheet 1201, on which a plurality of regions 1202 for applying a correcting liquid are designated. The operator applies an identical correcting liquid on the designated regions 1202. After the correcting liquid dries, the operator sets the correction sheet 1201 on the scanner 102 and inputs a read start instruction by operating the console 104.

The CPU 304 controls the white reference change unit 106 to set, in the shading unit 107, shading coefficients S which do not make the read luminance values saturate even upon reading a region with a very low reflection density (S3002). The CPU 304 reads the correction sheet 1201 applied with the correcting liquid using the scanner 102, and analyzes the signal values of the regions 1202 applied with the correcting liquid (S3003).

Figure 26:
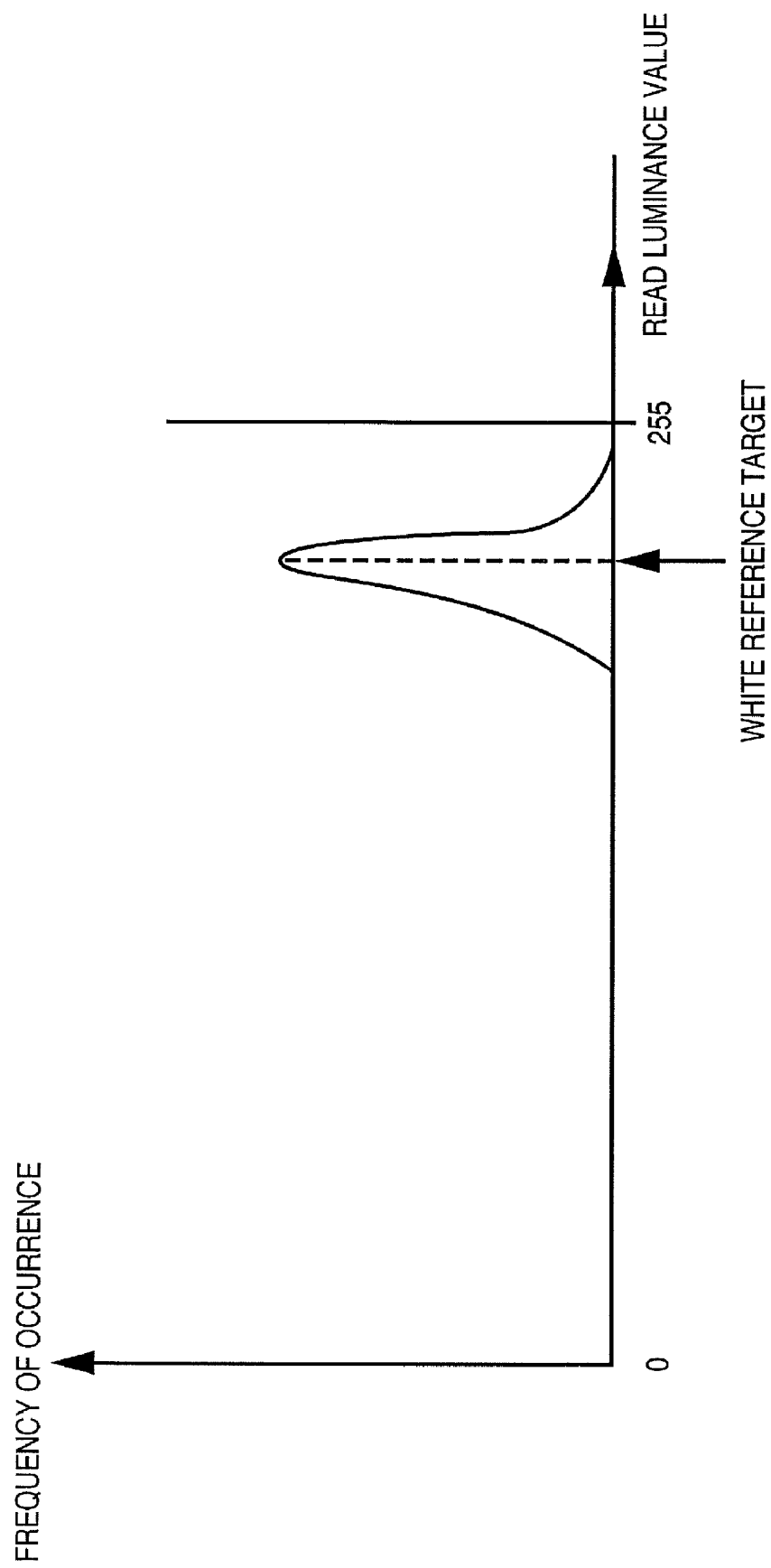
FIG. 26 shows the histogram of signal values of correcting liquid applied regions.

FIG. 26 shows the histogram of the signal values of the regions 1202. The CPU 304 averages the mode values of signal values of the respective regions 1202, calculates a central value, calculates shading coefficients S that convert these values to 255, and stores the calculated coefficients S in the storage unit 305 (S3004).

In this way, the shading coefficients S according to the correcting liquid can be acquired and used.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-317114, filed Oct. 31, 2005, which is hereby incorporated by reference herein in its entirety.

What is claimed is:

1. An image processing apparatus for reading a document image and converting the read document image into image data, comprising:
   a reader constructed to read a document image to generate image data of the document image;
   a corrector constructed to perform shading correction on the generated image data using a shading coefficient which is based on a reflection density of a correction region to which a correction fluid is applied;
   a detector constructed to detect a background of the corrected image data; and
   a first extractor constructed to extract a lower density region having a density lower than a density of the detected background.

2. The apparatus according to claim 1, further comprising a notification section constructed to notify, when the lower density region is found, a message that advises accordingly.

3. The apparatus according to claim 1, further comprising a second extractor constructed to extract a text region included in the lower density region.

4. The apparatus according to claim 1, further comprising a setting section constructed to set boundary pixels around the lower density region.

5. The apparatus according to claim 4, further comprising an image processor constructed to apply image processing that allows easy identification of the lower density region to the boundary pixels or the lower density region.

6. The apparatus according to claim 1, further comprising a controller constructed to control a white reference value of the reader in accordance with the background density and the density of the lower density region.

7. The apparatus according to claim 6, wherein the controller controls a printer to print a sheet required to acquire the white reference value, and calculates the white reference value from the read result of the sheet by the reader.

8. The apparatus according to claim 1, further comprising a selector constructed to allow selection of a normal read operation mode of a document image, and a read mode of a document image including extraction of the lower density region.

9. The apparatus according to claim 1, wherein the first extractor performs extraction for all lines or once every several lines in a main scan direction of the document image.

10. The apparatus according to claim 1, wherein the first extractor performs extraction for all lines or once every several lines in a main scan direction and sub-scan direction of the document image, and calculates logical sums of extraction results for respective pixels.

11. A method of reading a document image and converting the read document image into image data, the method comprising:
   using a processor programmed to perform steps including the steps of:
   reading a document image to generate image data of the document image;
   performing shading correction on the generated image data using a shading coefficient which is based on a reflection density of a correction region to which a correction fluid is applied;
   detecting a background of the corrected image data; and
   extracting a lower density region having a density lower than a density of the detected background.

12. A non-transitory computer readable medium which retrievably stores a computer-executable program for causing a computer to perform a method of reading a document image and converting the read document image into image data, the method comprising the steps of:
   reading a document image to generate image data of the document image;
   performing shading correction on the generated image data using a shading coefficient based on a reflection density of a correction region to which a correction fluid is applied;
   detecting a background of the corrected image data; and
   extracting a lower density region having a density lower than a density of the detected background.

* * * * *